United States Patent
Babour et al.

(10) Patent No.: US 6,515,592 B1
(45) Date of Patent: Feb. 4, 2003

(54) POWER AND SIGNAL TRANSMISSION USING INSULATED CONDUIT FOR PERMANENT DOWNHOLE INSTALLATIONS

(75) Inventors: Kamal Babour, Bures sur Yvette (FR); David Rossi, Houston, TX (US); Christian Chouzenoux, Saint Cloud (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/329,543

(22) Filed: Jun. 10, 1999

(30) Foreign Application Priority Data

Jun. 12, 1998 (GB) ................................. 9812812

(51) Int. Cl.[7] ................................. G01V 3/00
(52) U.S. Cl. ................. 340/854.4; 340/854.5; 340/854.6; 166/66; 175/40
(58) Field of Search .............. 340/854.4, 854.5, 340/854.6, 855.5; 175/40; 166/65.1, 66

(56) References Cited

U.S. PATENT DOCUMENTS

| | | | |
|---|---|---|---|
| 4,057,781 A | | 11/1977 | Scherbatskoy |
| 4,616,702 A | | 10/1986 | Hanson et al. |
| 4,691,203 A | * | 9/1987 | Rubin et al. .............. 324/369 |
| 4,839,644 A | | 6/1989 | Safinya et al. ........... 340/854.3 |
| 4,845,494 A | * | 7/1989 | Hanson et al. ............. 166/206 |
| 4,914,433 A | * | 4/1990 | Galle ...................... 340/854.4 |
| 5,138,313 A | | 8/1992 | Barrington |
| 5,268,683 A | * | 12/1993 | Stolarczyk ................... 175/40 |
| 5,394,141 A | * | 2/1995 | Soulier ........................ 175/40 |
| 5,467,083 A | * | 11/1995 | McDonald et al. ...... 340/854.4 |
| 5,493,288 A | * | 2/1996 | Henneuse ................ 340/853.3 |
| 5,576,703 A | * | 11/1996 | MacLeod et al. ............ 175/40 |
| 5,587,707 A | | 12/1996 | Dickie et al. |
| 5,675,325 A | * | 10/1997 | Taniguchi et al. ........ 340/854.4 |
| 5,745,047 A | * | 4/1998 | Van Gisbergen et al. 340/853.1 |
| 5,914,911 A | * | 6/1999 | Babour et al. ........... 340/853.7 |
| 5,942,990 A | * | 8/1999 | Smith et al. .................. 166/64 |
| 6,075,461 A | * | 6/2000 | Smith ...................... 340/853.7 |

FOREIGN PATENT DOCUMENTS

| | | |
|---|---|---|
| EP | 0 721 053 A1 | 7/1996 |
| EP | 99 20 1789 | 3/2000 |
| GB | 2 076 039 A | 11/1981 |
| WO | WO 99/37044 | 7/1999 |

* cited by examiner

*Primary Examiner*—Michael Horabik
*Assistant Examiner*—Albert K. Wong
(74) *Attorney, Agent, or Firm*—Victor H. Segura; Brigitte L. Jeffery

(57) ABSTRACT

An apparatus and method is presented for establishing electrical connection to permanent downhole oilfield installations using an electrically insulated conducting casing. Current is caused to flow in the casing by a source on the surface connected to the casing. One or more permanent downhole installations are electrically connected to the casing, and the electrical connection to the casing is used to power the downhole installations. The downhole installations also inject a signal into the insulated casing that passes via the casing to a surface readout which detects and records the downhole signals.

88 Claims, 19 Drawing Sheets

US 6,515,592 B1

POWER AND SIGNAL TRANSMISSION USING INSULATED CONDUIT FOR PERMANENT DOWNHOLE INSTALLATIONS

BACKGROUND OF THE INVENTION

1. Technical Field

The present invention relates to monitoring and control of subsurface installations located in one or more reservoirs of fluids such as hydrocarbons, and more particularly to methods and installations for providing wireless transmission of power and communication signals to, and receiving communication signals from, those subsurface installations.

2. Related Background Art

Reservoir monitoring includes the process of acquiring reservoir data for purposes of reservoir management. Permanent monitoring techniques are frequently used for long-term reservoir management. In permanent monitoring, sensors are often permanently implanted in direct contact with the reservoir to be managed. Permanent installations have the benefit of allowing continuous monitoring of the reservoir without interrupting production from the reservoir and providing data when well re-entry is difficult, e.g. subsea completions.

Permanent downhole sensors are used in the oil industry for several applications. For example, in one application, sensors are permanently situated inside the casing to measure phenomenon inside the well such as fluid flow rates or pressure.

Another application is in combination with so-called smart or instrumented wells with downhole flow control. An exemplary smart or instrumented well system combines downhole pressure gauges, flow rate sensors and flow controlling devices placed within the casing to measure and record pressure and flow rate inside the well and adjust fluid flow rate to optimize well performance and reservoir behavior.

Other applications call for using sensors permanently situated in the cement annulus surrounding the well casing. In these applications, formation pressure is measured using cemented pressure gauges; distribution of water saturation away from the well using resistivity sensors in the cement annulus; and seismic or acoustic earth properties using cemented geophones. Appropriate instrumentation allows other parameters to be measured.

These systems utilize cables to provide power and/or signal connection between the downhole devices and the surface. The use of a cable extending from the surface to provide a direct to connection to the downhole devices presents a number of well known advantages.

There are however, a number of disadvantages associated with the use of a cable in the cement annulus connecting the downhole devices to the surface including: a cable outside the casing complicates casing installation; reliability problems are associated with connectors currently in use; there is a risk of the cable breaking; the cable needs to be regularly anchored to the casing with cable protectors; the presence of a cable in the cement annulus may increase the risk of an inadequate hydraulic seal between zones that must be isolated; added expense of modifications to the wellhead to accommodate the feed-through of large diameter multi-conductor cables; the cables can be damaged if they pass through a zone that is perforated and it is difficult to pass the cable across the connection of two casings of different diameters.

In efforts to alleviate these and other disadvantages of downhole cable use, so-called "wireless systems" have been developed.

Bottom electromagnetic telemetry allows for electrical signals to be injected into conductive casings to create an electrical dipole source at the bottom of the well in order to telemeter measurement data from the subsurface to the surface. A related idea uses currents in a casing segment downhole to establish a magnetic field in the earth, the latter used to steer another well being drilled.

Bottom switching as telemetry via casing and tubing or wireline utilizes various arrangements of an electrical switch downhole between casing and tubing, between casing and a wireline tool, or between two electrically isolated segments of casing to send downhole measurement data to a surface detection and recording system.

Tubing-Casing transmission ("TUCAS"), a wireless two-way communication system, developed and patented by Schlumberger (U.S. Pat. No. 4,839,644 which is incorporated herein by reference), in which an insulated system of tubing and casing serve as a coaxial line as illustrated in FIG. 1. Both power and two-way signal (communication) transmission are possible in the TUCAS system. Because the system uses an inductive coupling technique to inject or retrieve power and signal from the system, only on the order of several tens of watts of power can be sent to the downhole sensor devices, which is adequate for commercial pressure gauge sensors. Additionally, electrical insulation between the tubing and casing must be maintained.

Likewise, shortcomings are evident in known systems where a toroid is used for current injection in casing or a drill string which is in contact with a surrounding cement annulus or earth formation. In addition to the limitations on the level of power which can be inductively coupled, the current loop will be local as the current return will seek the shortest electrical path through the formation to return to casing, as illustrated in FIG. 2.

Another system using casing conductivity injects current for locally heating the formation to help move viscous hydrocarbon fluids. This system, as illustrated in FIG. 3, concentrates a large current into a minimal area resulting in localized high current density in the resistive earth, thereby generating heat. High current density is seen in heated zone H while very low current density is seen at surface return electrode R.

A simple surface return is utilized as there is no concern with overall system efficiency as far as electrical circulation is concerned. This type of system does not use the casing in conjunction with downhole electronics, i.e. for communication with or direct power transfer to downhole electronics, but rather focuses on the generation of heat in the formation via concentration of a large current flux at the end of the casing in zone H. Insulation is employed for current concentration in zone H by preventing injected current from flowing out of the casing to the surrounding formation except where desired—i.e., at the bottom of the well where the casing is exposed in zone H.

Several practical disadvantages are evident in such a system as that of FIG. 3. One primary, and potentially dangerous disadvantage is that the wellhead is necessarily maintained at a very high potential in order to achieve the desired current density at well bottom to generate sufficient formation heating for their desired purposes. This can pose significant danger to the crew at the well site.

SUMMARY OF THE INVENTION

Limitations of the prior art are overcome by the method and apparatus of the present invention of power and signal transmission using insulated casing for permanent downhole installations as described hereinbelow.

The present invention is directed to various methods and apparatus for transmitting at least one electrical signal to or from at least one downhole device in a well. The method comprises providing an electrically conductive conduit in the well, electrically insulating a section of the conduit by encapsulating a section of the conduit with an insulative layer and insulating the encapsulated section of conduit from an adjoining section of the conduit by using a conduit gap, introducing the electrical signal within the insulated section of conduit, providing a return path for the electrical signal, and connecting the downhole device to the insulated section.

In alternative embodiments, the method includes introducing the electrical signal is performed via inductive coupling and/or direct coupling. The electrical signal includes power or communication signals. The electrical signals can be introduced by one of the downhole devices or by a surface device, directly or inductively coupled to the insulated section of conduit. The method may also include use of a second conduit gap to form a completely electrically insulated conduit section. In the various embodiments, single or multiple devices may be coupled to the insulated section of conduit. The return path for the electrical signal may be provided through the earth formation surrounding the well, through the cement annulus or through an outer conductive layer of the conductive conduit. An apparatus is also disclosed for transmitting at least one electrical signal to or from at least one downhole device in a well. In various embodiments, the apparatus comprises an electrically conductive conduit installed in the well, insulation means for electrically insulating a section of the conduit, the insulation means comprising an insulative encapsulation layer around the section of the conduit and a conduit gap insulating the insulated section of the conduit from an adjoining section of the conduit, means for introducing the electrical signal within the insulated section of the conduit, means for providing a return path for the electrical signal, and means for electrically connecting the downhole device to the insulated section of the conduit. In alternative embodiments, the apparatus comprises inductive coupling and/or direct coupling for introducing the electrical power or communication signals. The electrical signals can be introduced by one of the downhole devices or by a surface device, directly or inductively coupled to the insulated section of conduit. The apparatus may also comprise a second conduit gap to form a completely electrically insulated conduit section. In the various embodiments, single or multiple devices may be coupled to the insulated section of conduit. The return path for the electrical signal may be provided through the earth formation surrounding the well, through the cement annulus or through an outer conductive layer of the conductive conduit.

The foregoing and other features and advantages of the present invention will become more apparent in light of the following detailed description of exemplary embodiments thereof, as illustrated in the accompanying drawings.

BRIEF DESCRIPTION OF DRAWINGS

The following drawings are referenced in the detailed description which follows and are provided to facilitate a better understanding of the invention disclosed herein.

DETAILED DESCRIPTION OF THE PREFERRED EMBODIMENTS

Figure 1:
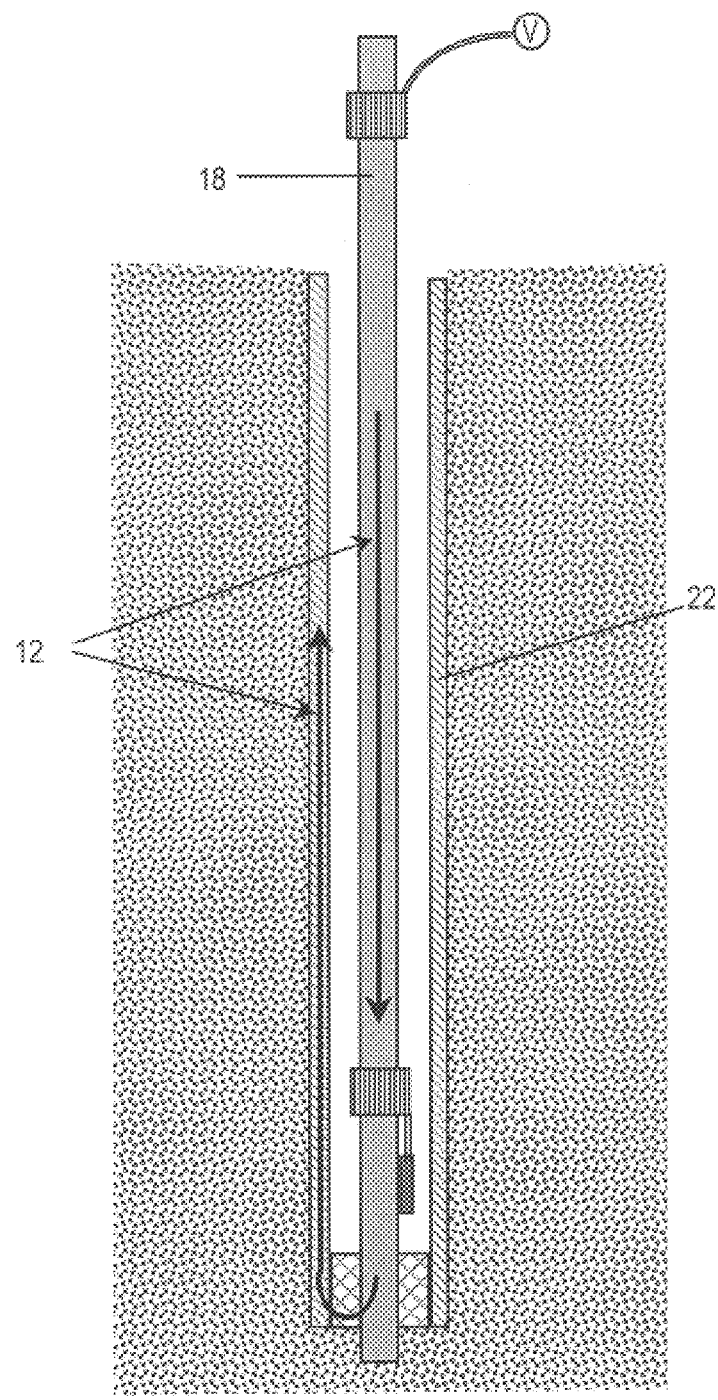
FIG. 1 illustrates a known wireless transmission apparatus.
Figure 2:
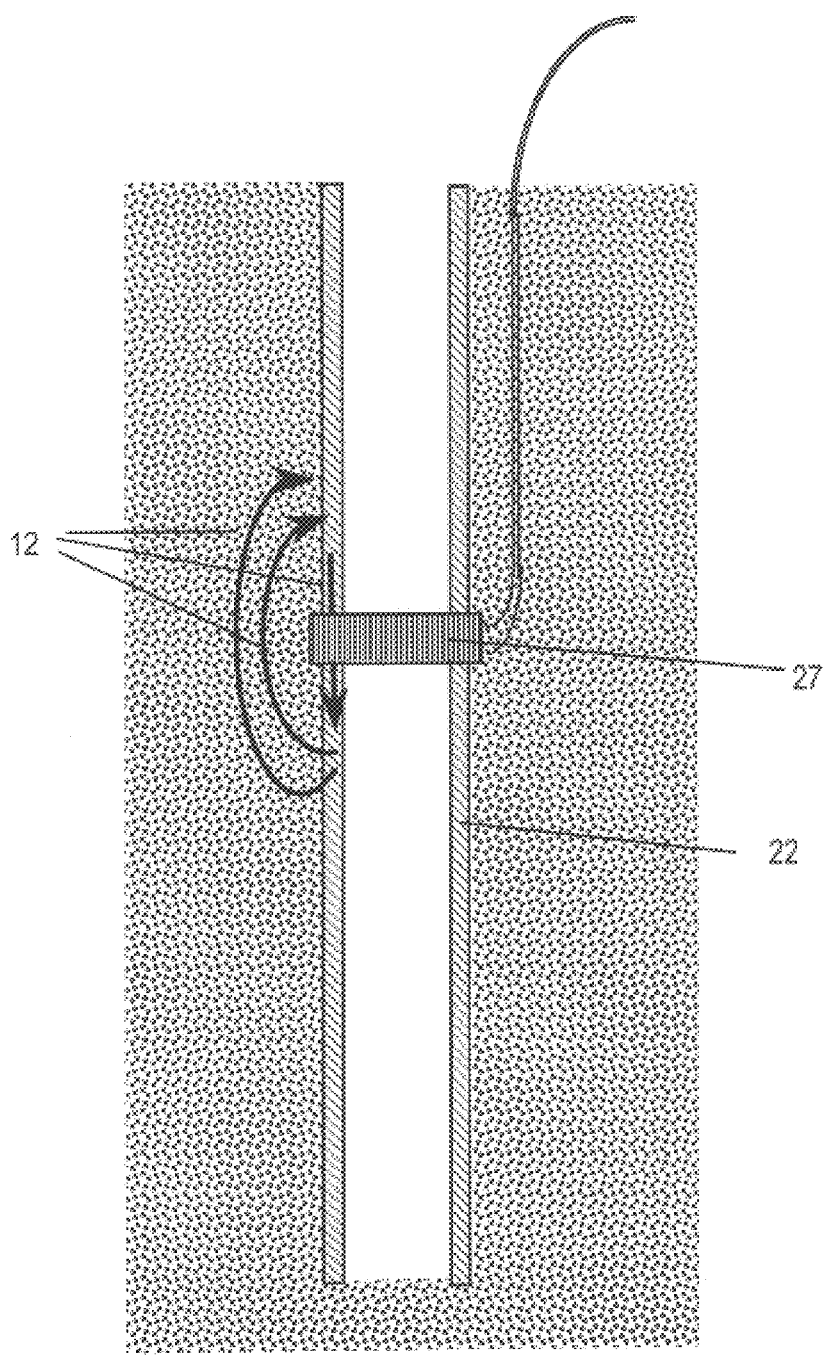
FIG. 2 illustrates known behavior of induced current.
Figure 3:
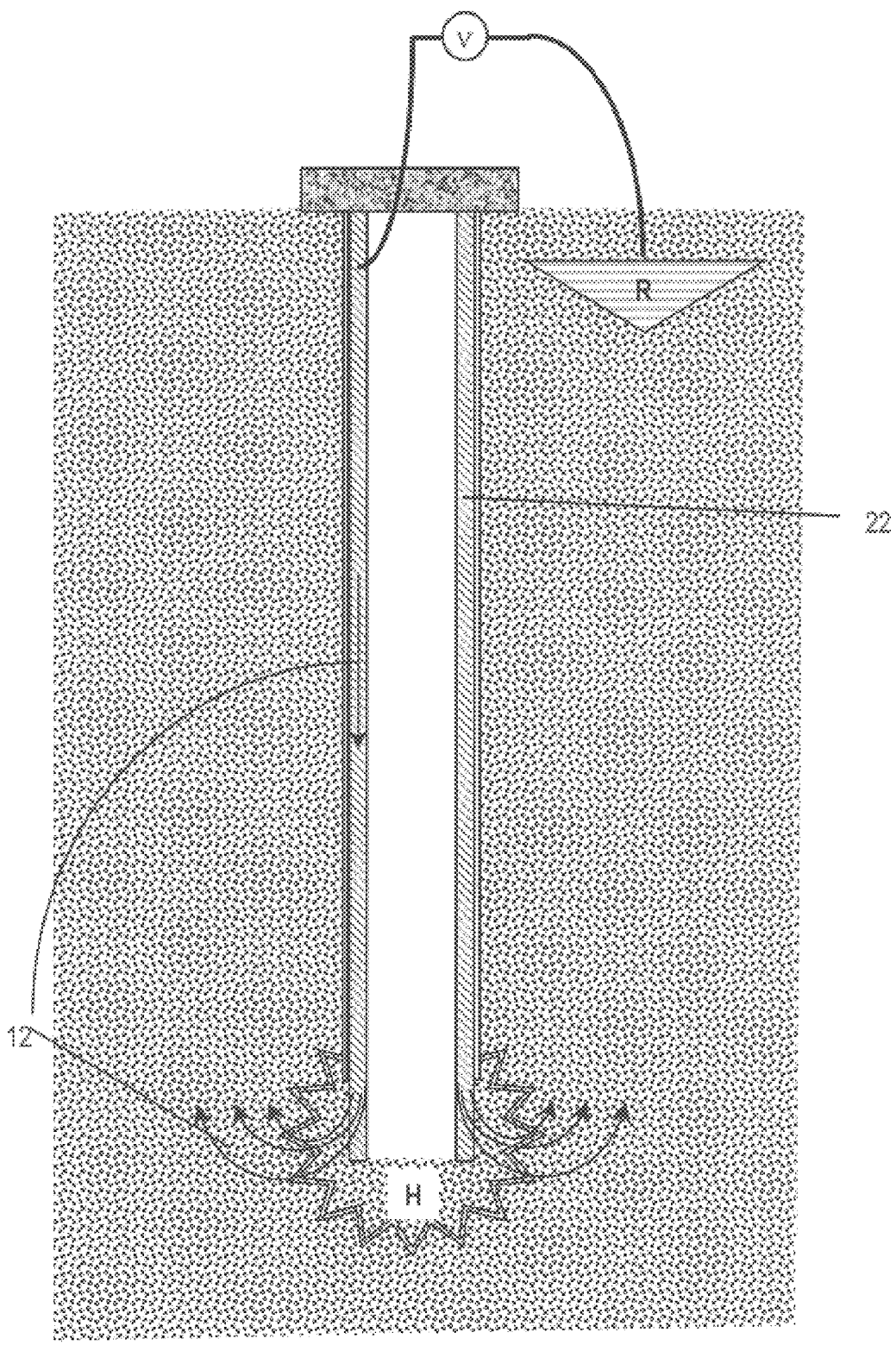
FIG. 3 illustrates a known apparatus for earth formation heating.
Figure 4:
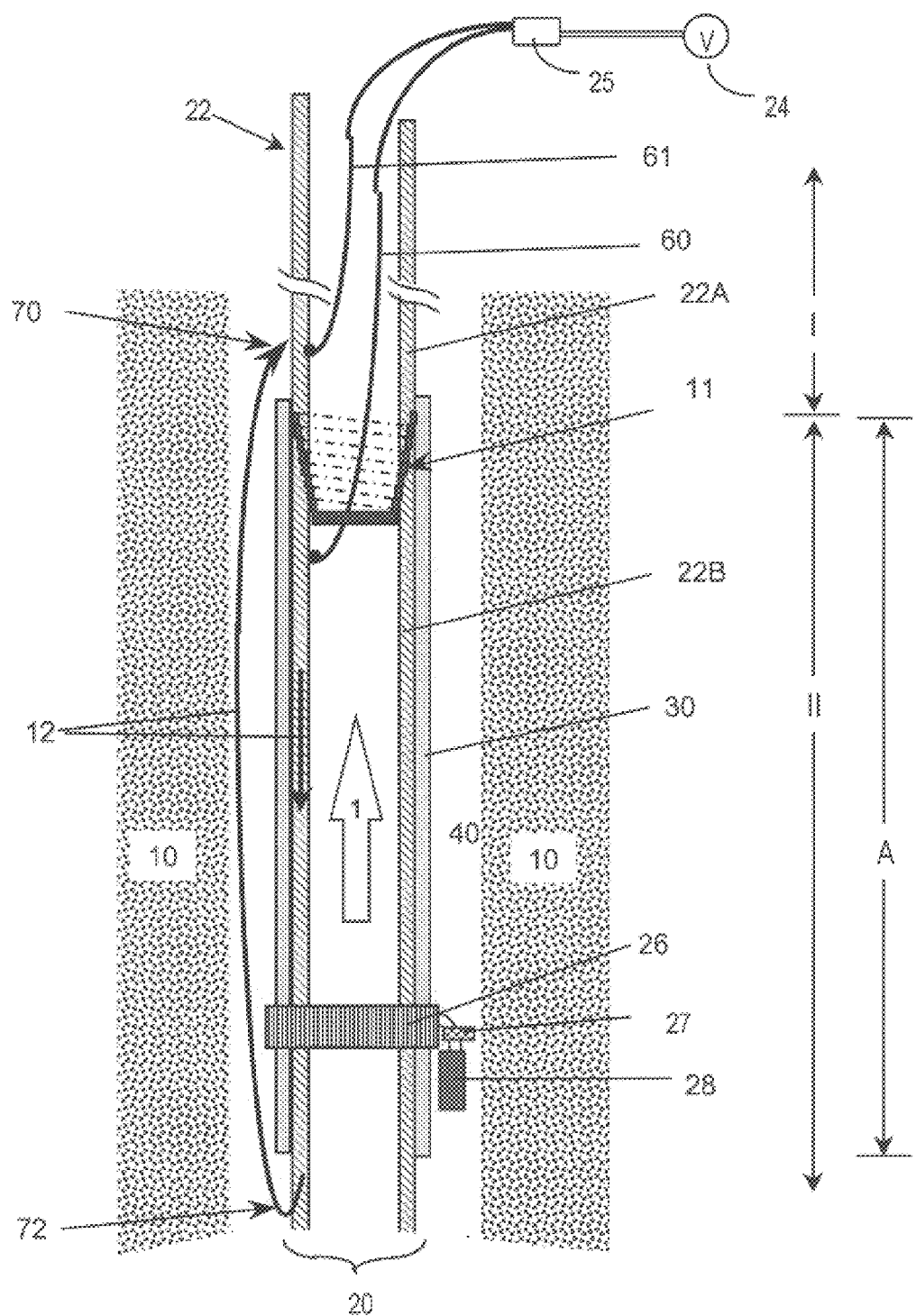
FIG. 4 illustrates one embodiment of the present invention using an insulated casing with direct uphole and inductive downhole coupling.

Shown in FIG. 4 is an illustrative embodiment of the present invention.

A well 1 (with direction of production flow in well indicated by arrow) is drilled into earth formation 10 and completed with an insulated conductive conduit 20 secured by a cement annulus 40. While in this exemplary embodiment a production well is shown, the invention is equally applicable to other types of wells.

Conduit gap 11 is disposed within the conductive conduit so as to provide 2 electrical zones of the conduit I and II, above and below the gap, respectively.

In this embodiment, the conductive conduit is implemented as a casing string 22 including casing segments 22A and 22B, region A of the string 22 being insulated by insulative layer 30. The 2 electrical zones are effected by providing an electrical "gap" between casing segments 22A and 22B where casing segment 22A is electrically insulated from segment 22B by the gap. To fully effect the electrical zones, insulative layer 30 should extend along casing segment 22B beyond the gap 11 (i.e. to overlap segment 22A) so as to electrically isolate adjacent casing segments 22A and 22B from each other at the point of joining and throughout region A. Details concerning conduit gap 11 follow in the discussion associated with FIG. 14.

Above and below the electrically insulated region A of segment 22B are exposed portions of casing, which form top and bottom electrode portions, 70, 72 respectively. These portions are exposed to allow electrical contact between these limited electrode portions of the casing and surrounding annulus 40 and earth 10.

Surface equipment (including voltage source 24 and encoder/decoder 25) is connected to casing string 22 via lines 60 and 61 on either side of conduit gap 11. The current is injected via line 60 directly into casing segment 22B with a return connection on line 61 connected to casing segment 22A. The injected current will flow along illustrative current lines 12 through casing segment 22B, leaking into annulus 40 and earth formation 10 via bottom electrode 72 and seek a return path to casing segment 22A through top (return) electrode 70 back to casing segment 22A and to surface equipment via line 61.

At an appropriate depth in the well, measurement devices are installed inside or outside the casing. Measurement devices, typically sensors, measure a signal, related to a physical property of the earth formation, well or reservoir, on either the interior or exterior of the casing. For illustrative purposes, measurement device 28 in FIG. 4 is shown installed outside casing 22.

The downhole electronics in device 28 receive electrical power via induction from a toroidal transformer ("toroid") 26 on the outside of the casing 22, specifically casing segment 22B. The aforementioned injected current flowing through the casing segment 22B (here injected via line 60 as described above) inductively generates a voltage in the toroid 26 by known electromagnetic principles, used to power and communicate with the sensor. As is known, various signals (including power and communication) can be modulated on a single carrier current for transmission downhole via injection. Toroid 26 can be fitted and installed on a segment of casing 22 during casing manufacture, as can various measurement devices intended for permanent installation.

For communication to surface, the signal sensed by device 28 is encoded into a second alternating voltage in toroid 26 by downhole encoder circuit 27, at a frequency distinct from that of the injected current. This second voltage induces a second current in-casing segment 22B, which also flows along illustrative current lines 12 and is detected by a surface electronic detector 25 where it is recorded, stored or otherwise processed as required.

Although not shown, multiple measurement devices (of the same or different type) with encoding/decoding circuits, and/or multiple toroids may be placed at various points (vertically) along the insulated casing (i.e., throughout region A). This allows a multitude of measurement devices to be distributed along the length of the well to accomplish diverse measurements. The encoder/decoder circuit 27 of each measurement device may additionally be equipped with an addressable circuit that allows instructions to be sent to, and measurement signals received from, individually controllable measurement devices.

While a typical cement annulus 40 has conductive properties, special highly conductive formulations of cement can be used to increase the conductivity of the cement so as to provide a more conductive path for currents. The use of highly conductive cement formulations has the advantage of providing a return path with controllable electrical characteristics. Use of specially formulated highly conductive cement will aid in performance and efficiency but is not critical and typical cement can none-the-less be used.

As for all embodiments described herein, the permanently installed conductive conduit includes at least an inner conductive member and an outer insulative layer. The conductive member can be either: 1) traditional metallic, preferable non-magnetic, conductive casing; 2) conductive production tubing; or, 3) other conductive liner installed permanently (usually via cementing) downhole (such as those described with respect to FIGS. 15–17 hereinbelow). The conduit is circumferentially encapsulated by an insulating layer over a specified region. For illustrative purposes and without the intent of imposing limitation, the various embodiments discussed herein utilize conductive casing or a combination of casing and tubing as the conduit conductive member. The insulating layer can be ceramic, plastic, fiberglass or other material pre-applied to each casing section before it is shipped to the wellsite for installation or, alternatively, the insulating layer may be a coating, paint or wrapping pre-applied or to be applied on-site at the wellsite. A current source and return path are also provided as discussed with respect to the various embodiments herein. In the various embodiments herein, top and bottom electrode portions of the insulated conduit are exposed so as to allow the conductive conduit to electrically contact the surrounding cement annulus to provide a current source and return path. The principle of operation of the present invention remains unchanged regardless of the physical structure chosen as the conduit, the implementation of the insulating layer, the current source or return path.

Figure 5A:
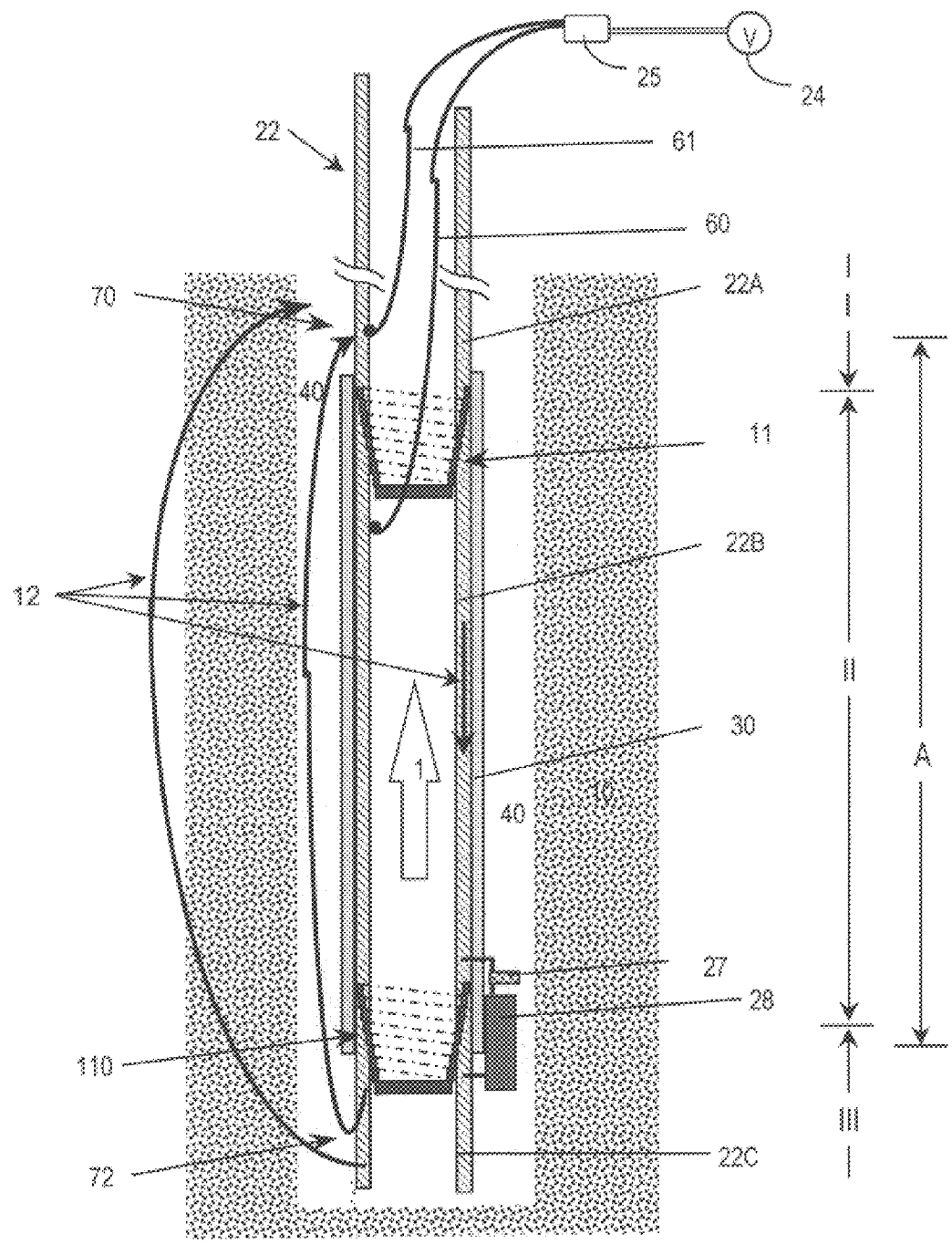
FIG. 5A illustrates an alternative embodiment of the present invention using an insulated casing with direct uphole and downhole coupling.

FIG. 5A illustrates an alternative embodiment of the present invention where direct coupling is used for both current injection and connection to the downhole measurement device.

Similar to the embodiment of FIG. 4, the conduit is implemented as a casing string 22 including casing segments 22A, 22B and 22C. Conduit gap 11 is placed within the casing string to provide electrical isolation between adjoining casing segments 22A and 22B. Second conduit gap 110 is located between adjoining casing segments 22B and 22C to provide electric zones I, II and III. The electric zones result from the electrical "gap" between casing segments 22A and 22B, and that between 22B and 22C, where casing segment 22A is electrically insulated from segment 22B by gap 11 and 22B electrically insulated from 22C by second gap 110. The insulative layer 30 extends beyond each gap 11, 110 to completely electrically insulate casing segment 22B. Current will flow through the conductive cement annulus 40 (and surrounding earth formation 10) between zone III and zone I (i.e., casing segments 22C and 22A) external to the insulated conductive conduit of region A.

Surface equipment (including voltage source 24 and encoder/decoder 25) is connected to the casing string 22 via a lines 60 and 61. The current is injected via line 60 into casing segment 22B with a return connection via line 61 connected to casing segment 22A.

Figure 5B:
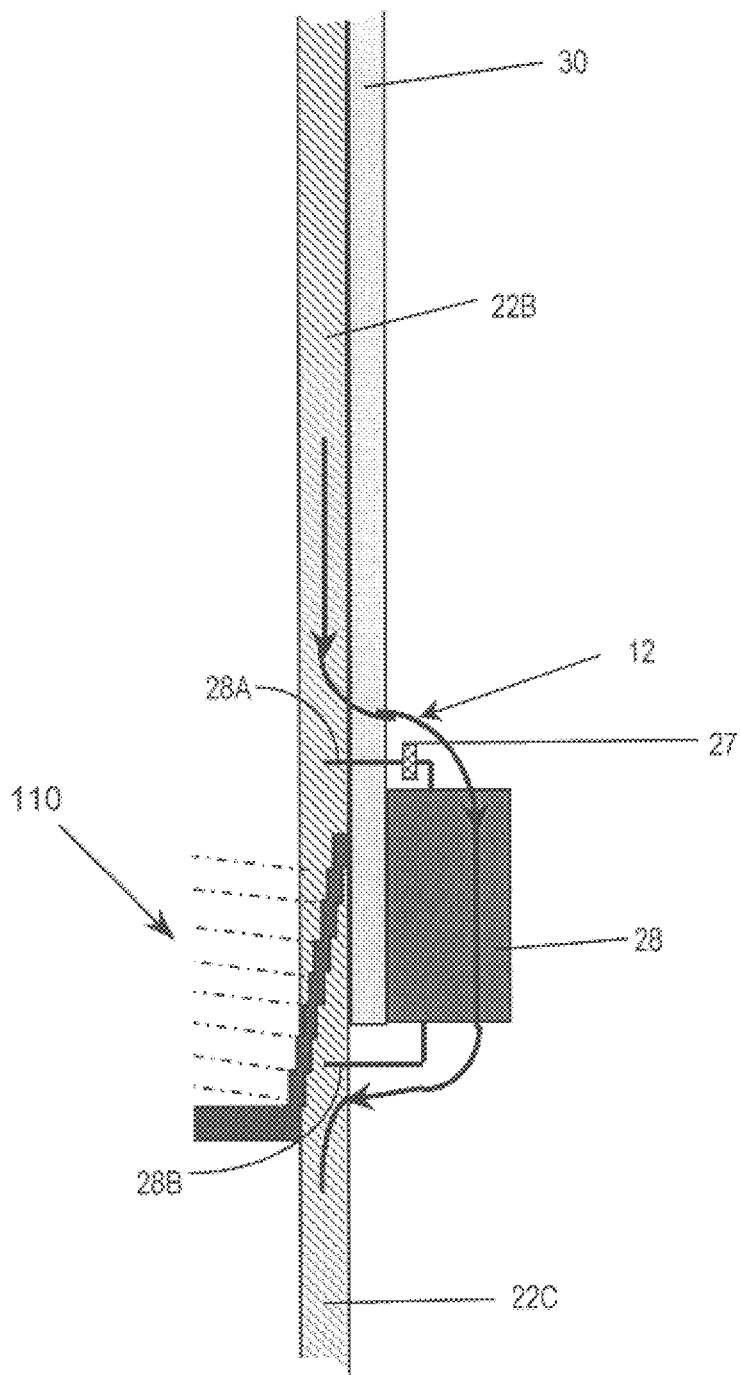
FIG. 5B illustrates the current path through the downhole device of FIG. 5A.

Communications with and power to device 28 are provided via direct connection of downhole device 28 to casing 22 as illustrated in FIG. 5B. Device 28 and casing segments 22B and 22C are connected in series, with independent connections via leads 28A and 28B on either side of gap 110 to casing segments 22B and 22C, respectively. Current from casing segment 22B will flow through device 28 to casing segment 22C.

Referring again to FIG. 5A, the injected current will flow along illustrative current lines 12 through casing segment 22B, through device 28 to 22C, leaking into annulus 40 via bottom electrode 72 and seeking a return path to casing segment 22A through top (return) electrode 70.

The current injection connection, via line 60 to casing segment 22B in both FIGS. 4 and 5A is achieved downhole locally within the insulated region A, below gap 11. The return connection (via line 61 and casing segment 22A in both FIGS. 4 and 5A), on the other hand, can be achieved downhole or alternatively near the surface without any diminished performance as all casing segments above gap 11 back to the surface are electrically connected. Direct downhole casing connections such as discussed with respect to the embodiments of FIGS. 4 and 5A can be achieved in any suitable manner to assure good (i.e., low loss, efficient) electrical contact. One known technique is the use of landing devices.

Figure 6:
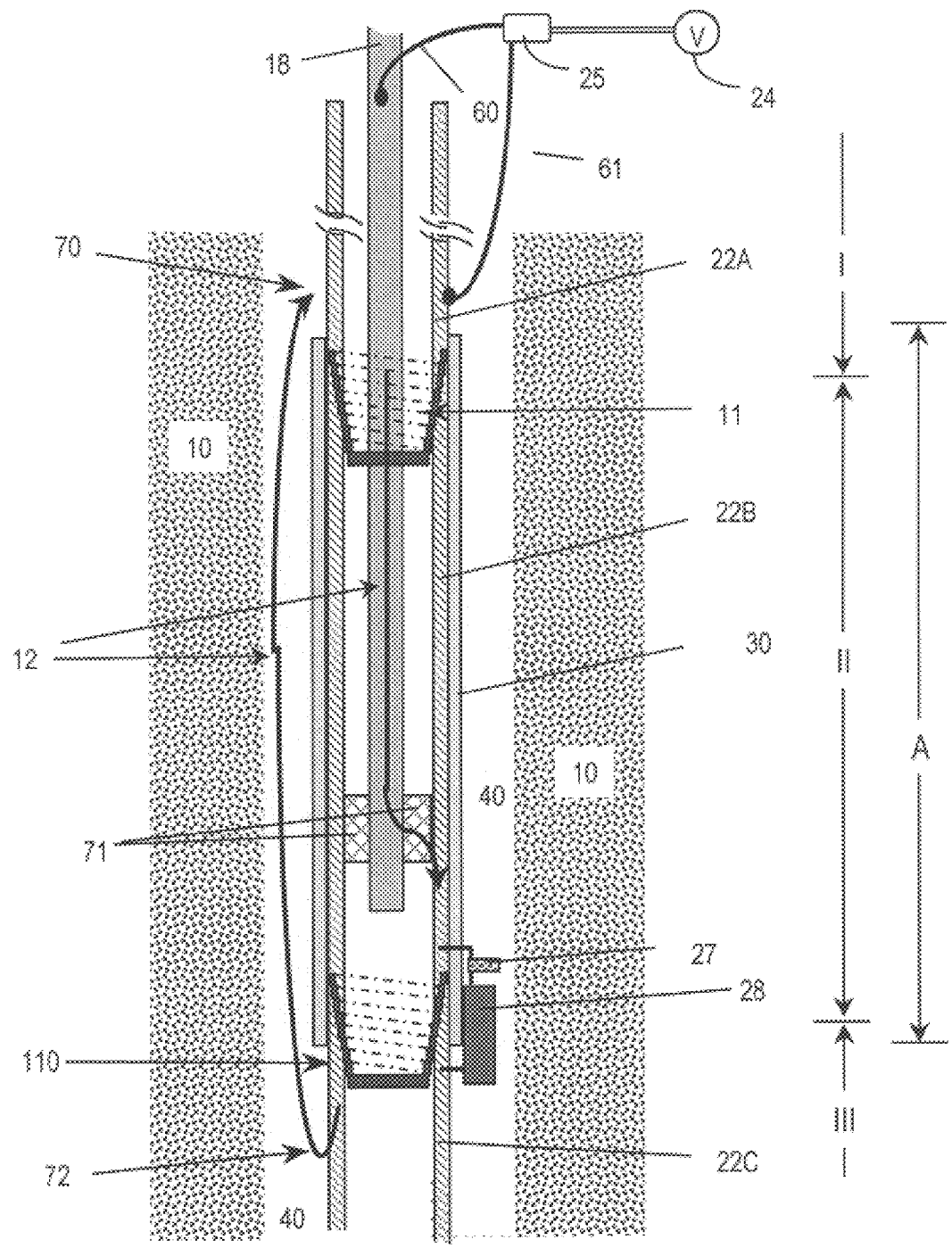
FIG. 6 illustrates an alternative embodiment of the present invention using insulated casing and production tubing with direct uphole and downhole coupling.

FIG. 6 shows an alternative embodiment of the present invention where electrical connection for current injection is achieved via direct connection to the conductive conduit and production tubing.

Similar to the embodiment of FIG. 5A, the conductive conduit is implemented as a casing string 22 which includes casing segments 22A, 22B and 22C. Conduit gap 11 is placed within the casing string to provide electrical isolation between adjoining casing segments 22A and 22B. Second conduit gap 110 is disposed between adjoining casing segments 22B and 22C providing electrical zones I, II and III. The electric zones result because of the electrical "gap" between casing segments 22A and 22B, and 22B and 22C, where casing segment 22A is electrically insulated from segment 22B by gap 11 and 22B electrically insulated from 22C by second gap 110. The insulative layer 30 extends beyond each gap 11, 110 to completely electrically insulate casing segment 22B. Current will flow through the conductive cement annulus 40 (and surrounding earth formation 10) between zone III and zone I (i.e., casing segments 22C and 22A) external to the insulated conductive conduit of region A.

Tubing 18 is electrically isolated from the zone I and III casing (i.e., the casing segments from surface down through and including 22A and from and including 22C down to well bottom) by any of several known techniques such as providing an insulative layer around the tubing or an insulative layer on the inside of the casing or non-conductive centralizers (not shown) can be deployed in zones I and III. Tubing 18 is electrically connected to zone II casing via appropriate means such as conductive packer 71. Where insulated tubing is used the insulative layer must be traversed or removed at conductive packer 71 to allow for electrical contact with the casing (i.e., in the illustration, casing segment 22B).

Surface equipment (including voltage source 24 and encoder/decoder 25) is connected to the tubing 18 via line 60 and to zone I casing string via line 61. The current is injected via line 60 into tubing 18 with the return connection on line 61 connected to the zone I casing segment (22A). Electrical connection from tubing 18 to zone II casing segment 22B is achieved in this embodiment through conductive packer 71.

Communication with and power transmission to device 28 are achieved by direct connection of downhole device 28.

Device 28 and the casing segments 22B and 22C are connected in series, with independent connections via leads 28A and 28B on either side of gap 110 to casing segments 22B and 22C, respectively. Current from casing segment 22B will flow through device 28 on lead 28A to casing segment 22C on lead 28B. The series connection is as illustrated in FIG. 5B, discussed supra.

The injected current will flow along illustrative current lines 12 in tubing 18 through conductive packer 71 to zone II casing segment 22B, through device 28 to zone III casing segment 22C, leaking into annulus 40 via bottom electrode 72 and seeking a return path to zone I casing segment 22A through top (return) electrode 70.

Figure 7:
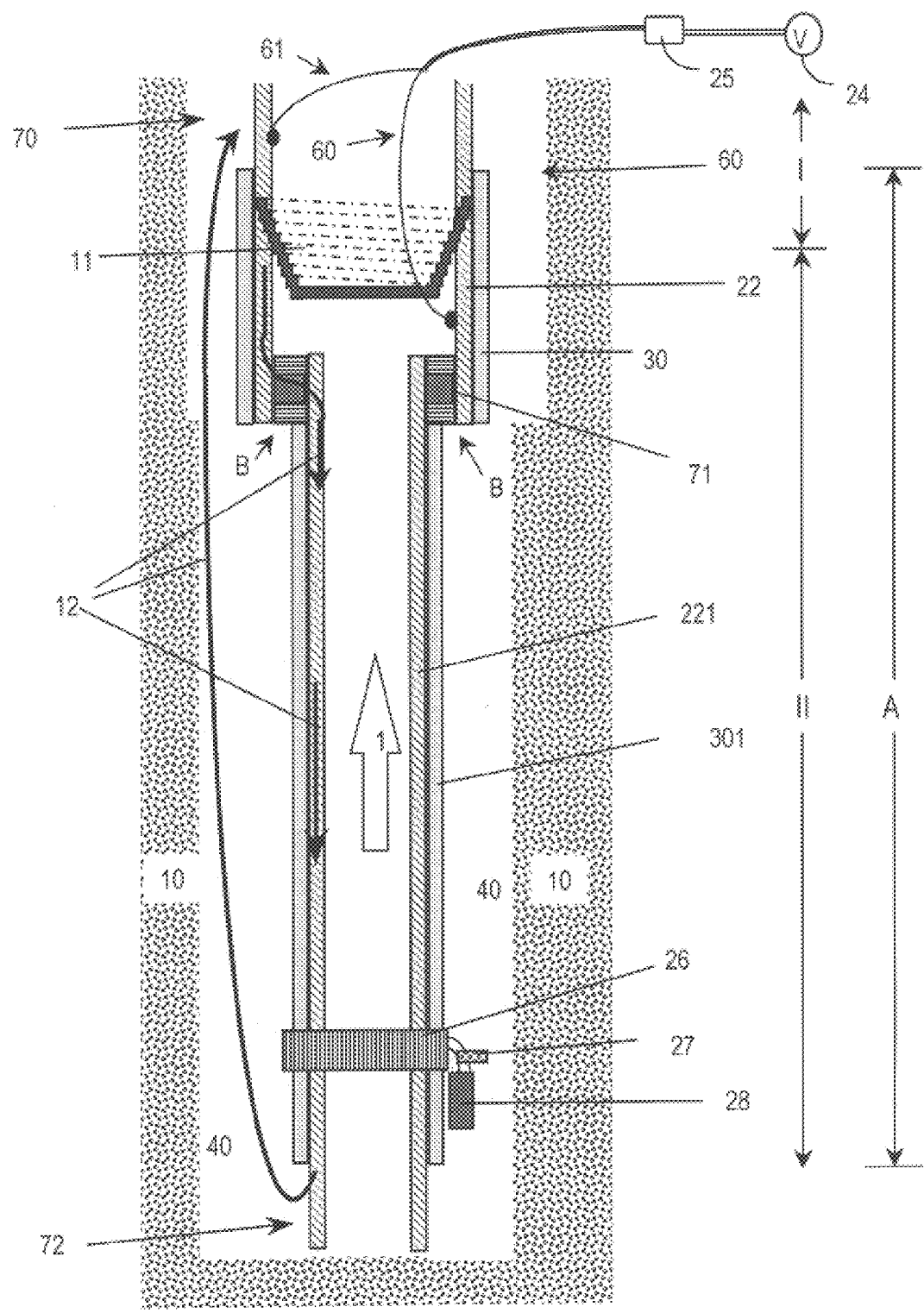
FIG. 7 illustrates an alternative embodiment of the present invention implemented with casing and/or tubing of different diameters.

The embodiment of FIG. 7 illustrates implementation of the present invention across two conductive conduits of varying diameter.

For illustrative purposes, an upper conduit section comprising a casing string 22 with an insulative layer 30, is connected electrically to a lower conduit section comprising smaller diameter production tubing 221 with an insulative layer 301. Insulative layers 30 and 301 form an insulated region A. Note that while it may be desirable to implement layers 30 and 301 as one continuous layer, a minimal break B between the layers 30 and 301 is acceptable because leakage through this exposed area would be negligible and not appreciably affect overall efficiency or operation of the present invention. Casing/casing and tubing/tubing conduit combinations are also possible as will be understood by one of skill in the art.

Operation of this embodiment is similar to that of the FIG. 4 embodiment where current is injected via direct coupling on line 60 and downhole device 28 is inductively coupled to the conduit via toroid 26. As in FIG. 4, injection (i.e., connection of line 60) and toroid 26 must be disposed within insulated region A so as to inject a current which is confined to flow in the conduit within region A to inductively couple to toroid 26 also placed within region A.

Figure 8:
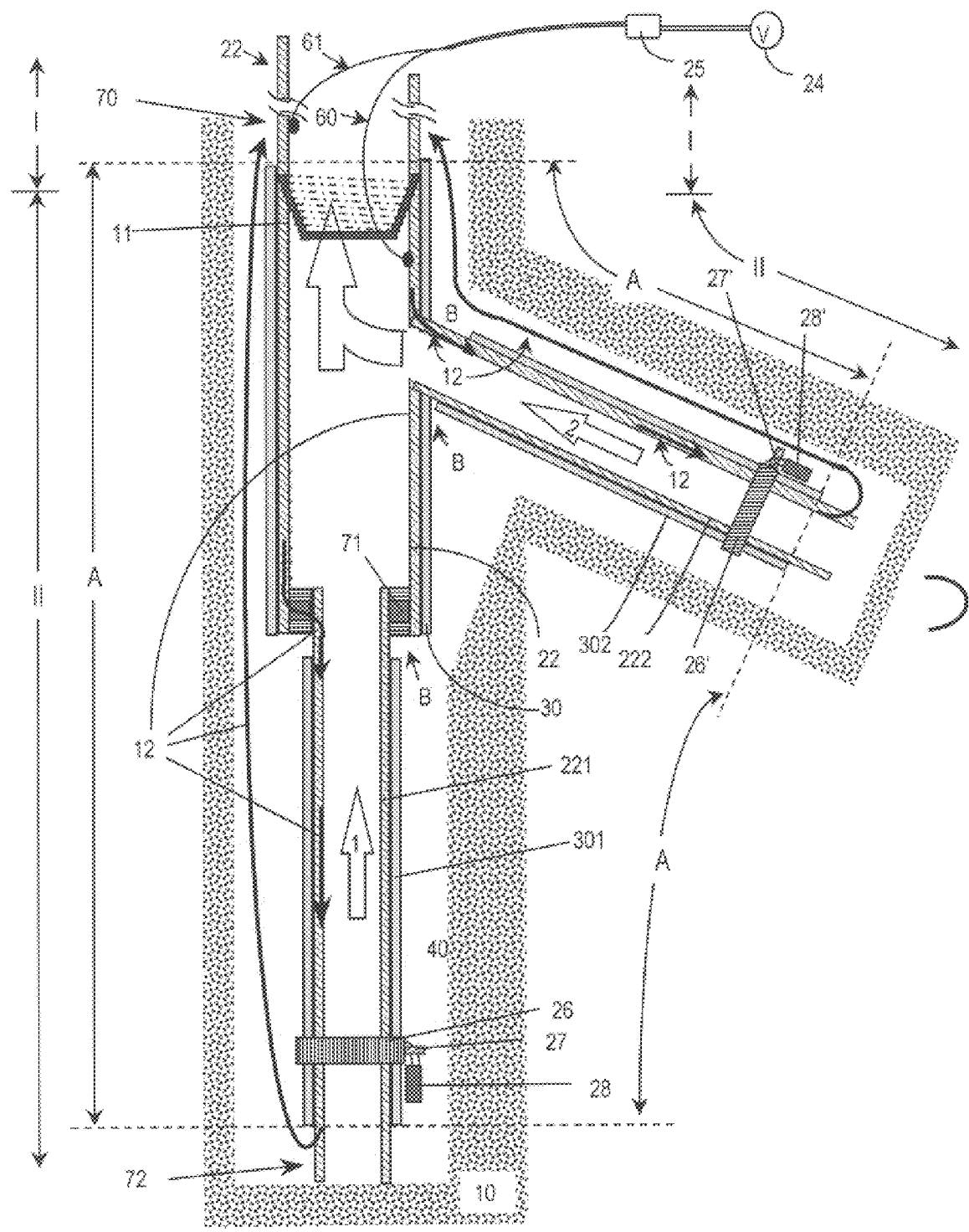
FIG. 8 illustrates an alternative embodiment of the present invention implemented in a well having a lateral well and casing and/or tubing of different diameters.

The embodiment of FIG. 8 illustrates the utility of the present invention in a lateral (or "side-track") well.

As discussed with regard to FIG. 7, implementation can be across conductive conduits of varying diameter. The illustrative embodiment of FIG. 8 shows an upper conduit section comprising a casing string 22 with an insulative layer 30 connected electrically to a lower conduit section comprising smaller diameter production tubing 221 with an insulative layer 301 (as in FIG. 7), and casing 222 and insulative layer 302 of a lateral well 2. Insulative layers 30, 301 and 302 form insulated region A as shown. Note that, as in FIG. 7, while it may be desirable to have layers 30, 301 and 302 be continuous, small breaks B between the layers is acceptable because leakage through this exposed area would be minimal and not appreciably affect overall efficiency or operation of the present invention. Casing strings 22, 221 and 222 should be electrically connected.

Operation of this embodiment is similar to that of the FIG. 7 embodiment where current is injected via direct coupling on lines 60 and 61 (above and below gap 11) and downhole devices 28 and 28' are inductively coupled to the conduit via toroids 26 and 26'. As in FIG. 7, injection (i.e., connection of line 60) must be within insulated region A so as to inject a current which will flow in the conduit within region A and likewise toroids 26 and 26' must be placed within region A to capture the injected current.

Although not shown, addressable circuitry can be added to the encoder/decoder circuit 25 of surface equipment and 27, 27' of downhole devices 28 and 28' to effect independent communication and control of the individual downhole devices.

Additional various combinations including direct downhole device coupling and/or inductive injection coupling connections will also be understood.

Figure 9:
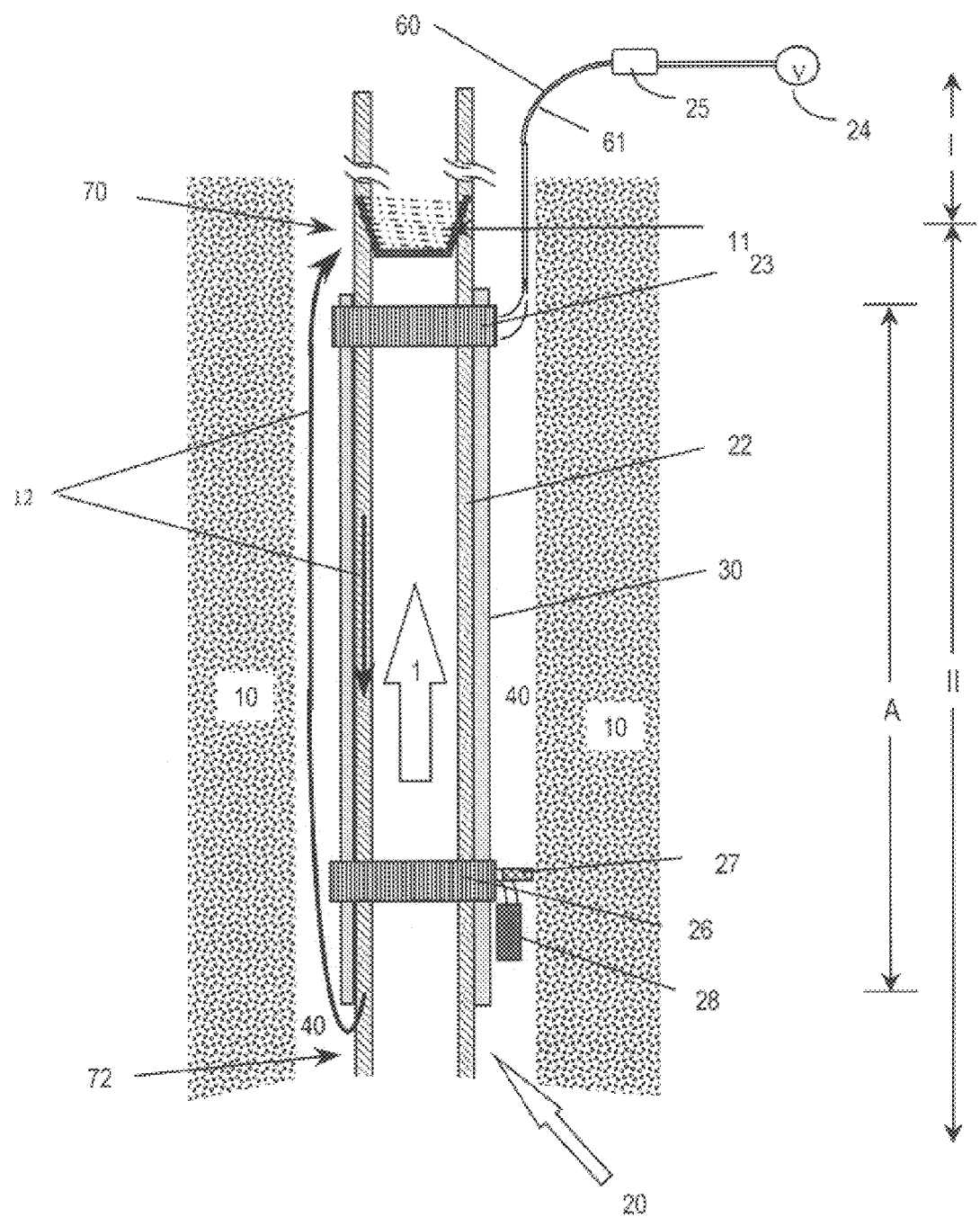
FIG. 9 illustrates one embodiment of the present invention using an insulated casing with inductive uphole and downhole coupling.

FIG. 9 illustrates one embodiment of the present invention in which insulated casing and inductive coupling is used for downhole power and two-way signal transmission.

Toroid 23 is used for current injection where a current is induced in casing 22 within insulated region A. Toroid 23 is linked to surface by a cable 60. Conduit gap 11 is used to form electrical zones I and II as previously discussed.

At the surface, electrical current is injected into toroid 23 via source 24 through cable 60, thereby inducing a current in casing 22 (by known electro-magnetic principles). The induced casing current flows along illustrative current paths 12 through the casing 22 where, at the bottom of the casing, via bottom electrode 72, the current leaks into the cement annulus 40 and flows through the annulus to the top (source and return) electrode 70.

Measurement device 28 receives electrical power from a toroid 26 on the outside of the casing 22 via induction where the aforementioned current flowing through the casing (here induced by toroid 23 as described above) inductively generates a voltage in the toroid 26 that is used to power the sensor. The toroid 26 can be fitted and installed on segments of casing 22 during casing manufacture, as can various measurement devices intended for permanent installation.

The signal sensed by measurement device 28 is encoded into a second alternating voltage in the toroid 26 by downhole encoder circuit 27, at a distinct frequency from that of the first injected current. This second voltage creates a second current in the casing 22, which also flows along illustrative current lines 12 and is detected by a surface electronic detector 25 where it is recorded, stored or otherwise processed.

Although not shown, multiple measurement devices (of the same or different type) with encoding/decoding circuits, and multiple toroids may be placed at various points along the insulated casing. This allows a multitude of measurement devices to be distributed along the length of the well to accomplish diverse measurements.

The encoder/decoder circuit 27 of each measurement device may additionally be equipped with an addressable circuit that allows instructions to be sent to, and measurement signals received from, individually controllable measurement devices.

Figure 10:
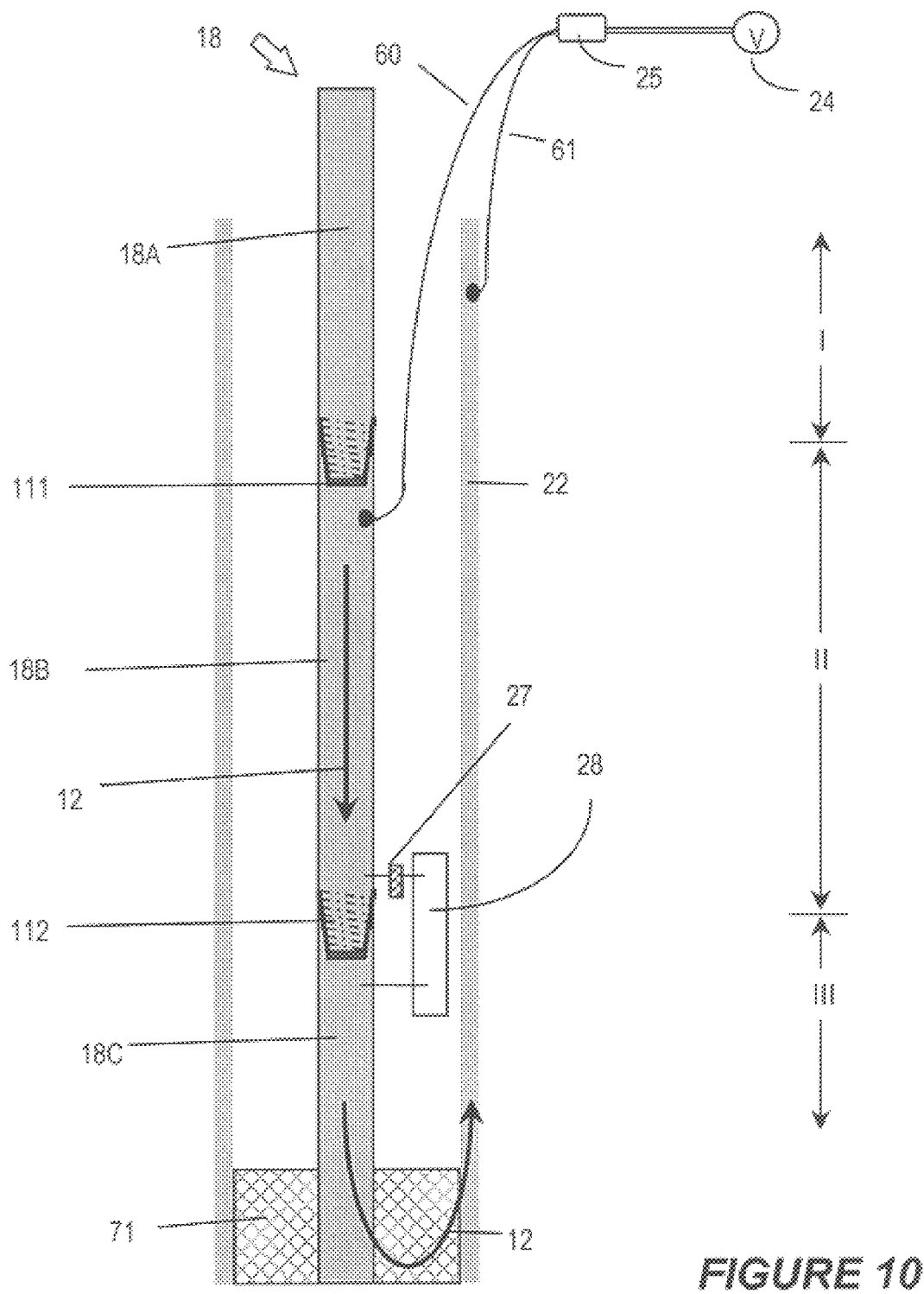
FIG. 10 illustrates one embodiment of the present invention where downhole devices are connected in series downhole through use of conduit gaps in the production tubing.

Illustrated in FIG. 10 is an alternative embodiment of the present invention where production tubing 18 is utilized as the conductive conduit and conventional (uninsulated) casing 22 is used as a return path for both communication with and power transmission to a downhole device 28.

Operationally similar to the embodiments of FIGS. 5A and 6, the conduit is implemented as production tubing string 18 including tubing segments 18A, 18B and 18C. Conduit gap 111 is placed within the tubing string to provide electrical isolation between tubing segments 18A and 18B. Second conduit gap 112 is located between tubing segments 18B and 18C to provide electrical zones I, II and III. The electrical zones result from the electrical "gap" between tubing segments 18A and 18B and 18B and 18C where tubing segment 18A is electrically insulated from segment 18B by gap 111 and 18B electrically insulated from 18C by gap 112. Zone II tubing (i.e., tubing segment 18B) is maintained in electrical isolation from casing 22 and is thus completely insulated electrically. This can be achieved in any of several known techniques such as providing an insulative layer around the tubing with the layer traversed or removed at connection to device 28, or by using, for example non-conductive centralizers (not shown) or non-conductive fluid in the interior annulus (i.e., the space between the tubing and casing) (not shown). Electrical connection is established between tubing segment 18C and casing 22 through conductive packer 71 for the current return path.

Surface equipment (including voltage source 24 and encoder/decoder 25) is connected to the tubing segment 18B and casing 22 via a lines 60 and 61, respectively. The current is injected via line 60 into tubing segment 18B with a return connection on line 61 connected to casing 22.

Direct connection of downhole device 28 to tubing 18 is used to communicate and provide power to device 28. Device 28 and the tubing segments 18B and 18C are connected in series, with independent connections via leads 28A and 28B on either side of gap 112 to tubing segments 18B and 18C, respectively. Current from tubing segment 18B will flow through device 28 to tubing segment 18C. The series connection is similar to that illustrated in FIG. 18B.

The injected current will flow along illustrative current lines 12 through tubing segment 18B, through device 28 to tubing segment 18C, through conductive packer 71 along a return path in casing 22.

Direct downhole tubing connections such as discussed with respect to the embodiments of FIG. 10 can be achieved in any suitable manner to assure good (i.e., low loss, efficient) electrical contact. One known technique is via landing devices. The injection connection, via line 60 to tubing segment 18B must be achieved downhole locally within zone II tubing. The return connection (via line 61 and casing 22), on the other hand, can be achieved downhole or alternatively near the surface without any diminished performance.

Figure 11:
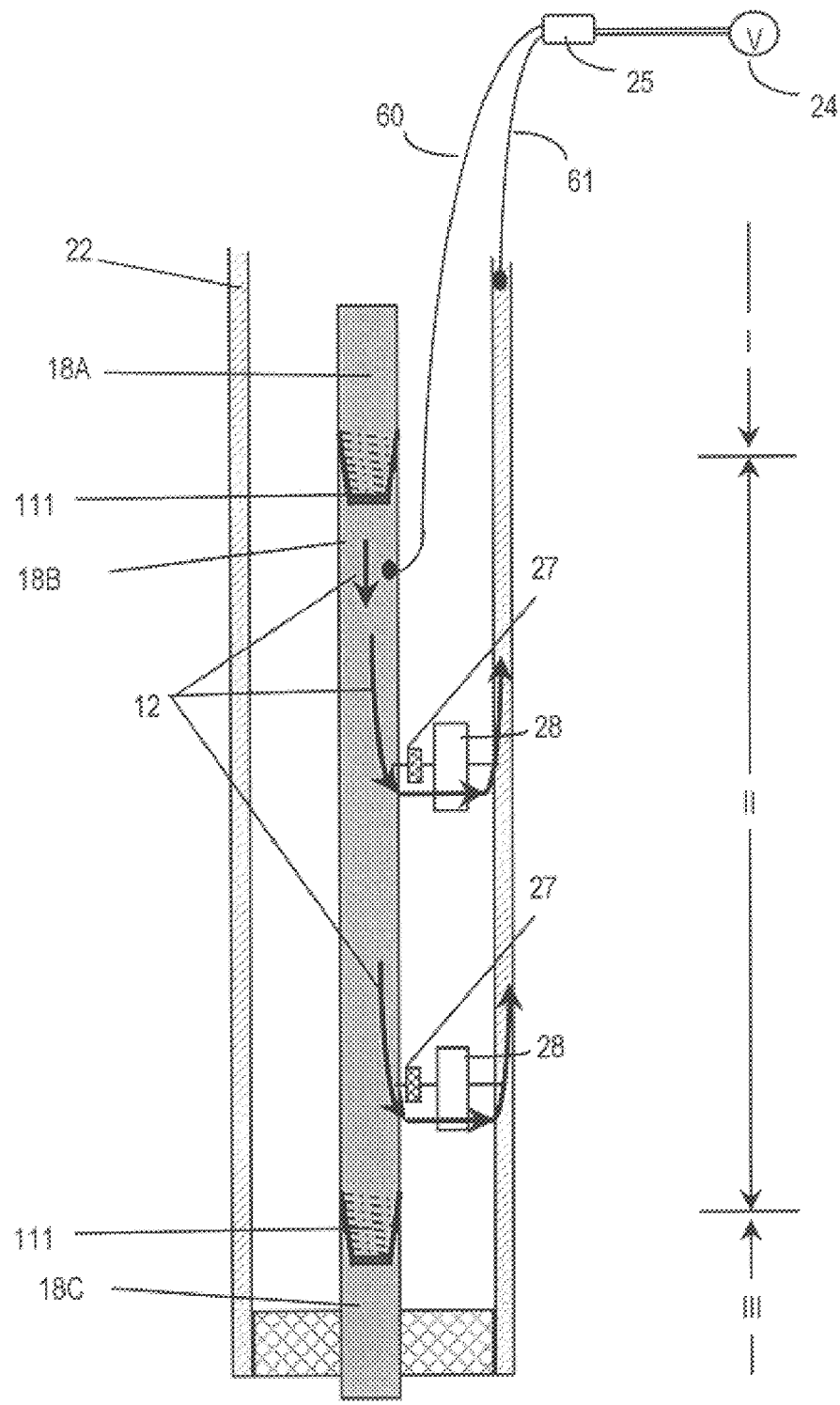
FIG. 11 illustrates an alternative embodiment of the present invention where multiple downhole devices are connected in parallel through use of conduit gaps in the production tubing.

Illustrated in FIG. 11 is an alternative embodiment of the present invention as shown in FIG. 10 useful for connecting multiple downhole devices. Here production tubing 18 is utilized as the conductive conduit and conventional casing 22 are used for communication with a downhole device 28 within the well.

The conduit is implemented as a production tubing string 18 including tubing segments 18A, 18B and 18C. Conduit gap 111 is placed within the tubing string to provide electrical isolation between tubing segments 18A and 18B. Second conduit gap 112 is disposed between tubing segments 18B and 18C to provide electric zones I, II and III. The electric zones result from the electrical "gap" between tubing segments 18A and 18B and 18B and 18C where tubing segment 18A is electrically insulated from segment 18B by gap 111 and 18B electrically insulated from 18C by gap 112 to completely insulate electrically tubing segment 18B.

Surface equipment (including voltage source 24 and encoder/decoder 25) is connected to the tubing segment 18B and casing 22 via a lines 60 and 61, respectively. A voltage is applied via line 60 into casing segment 18B with a return connection on line 61 connected to casing 22. A differential voltage is thus established between tubing segment 18B and casing 22.

Direct connection of downhole device 28 is used to communicate with and provide power to device 28. Device 28 is connected in parallel between the tubing segment 18B and casing 22. Current from tubing segment 18B will flow through device 28 to casing 22.

The current path will thus be along illustrative current lines 12 through tubing segment 18B, through device 28 to a return path along casing 22.

Direct downhole tubing connections such as discussed with respect to the embodiments of FIG. 11 can be achieved in any suitable manner to assure good (i.e., low loss, efficient) electrical contact. The voltage application connection, via line 60 to tubing segment 18B must be achieved downhole locally within the zone II tubing (i.e., segment 18B). The return connection (via line 61 and casing 22), on the other hand, can be achieved downhole or alternatively near the surface without any diminished performance.

As in FIG. 10, the zone II tubing (i.e., segment 18B) should be kept electrically isolated from the casing string 22.

Figure 12A:
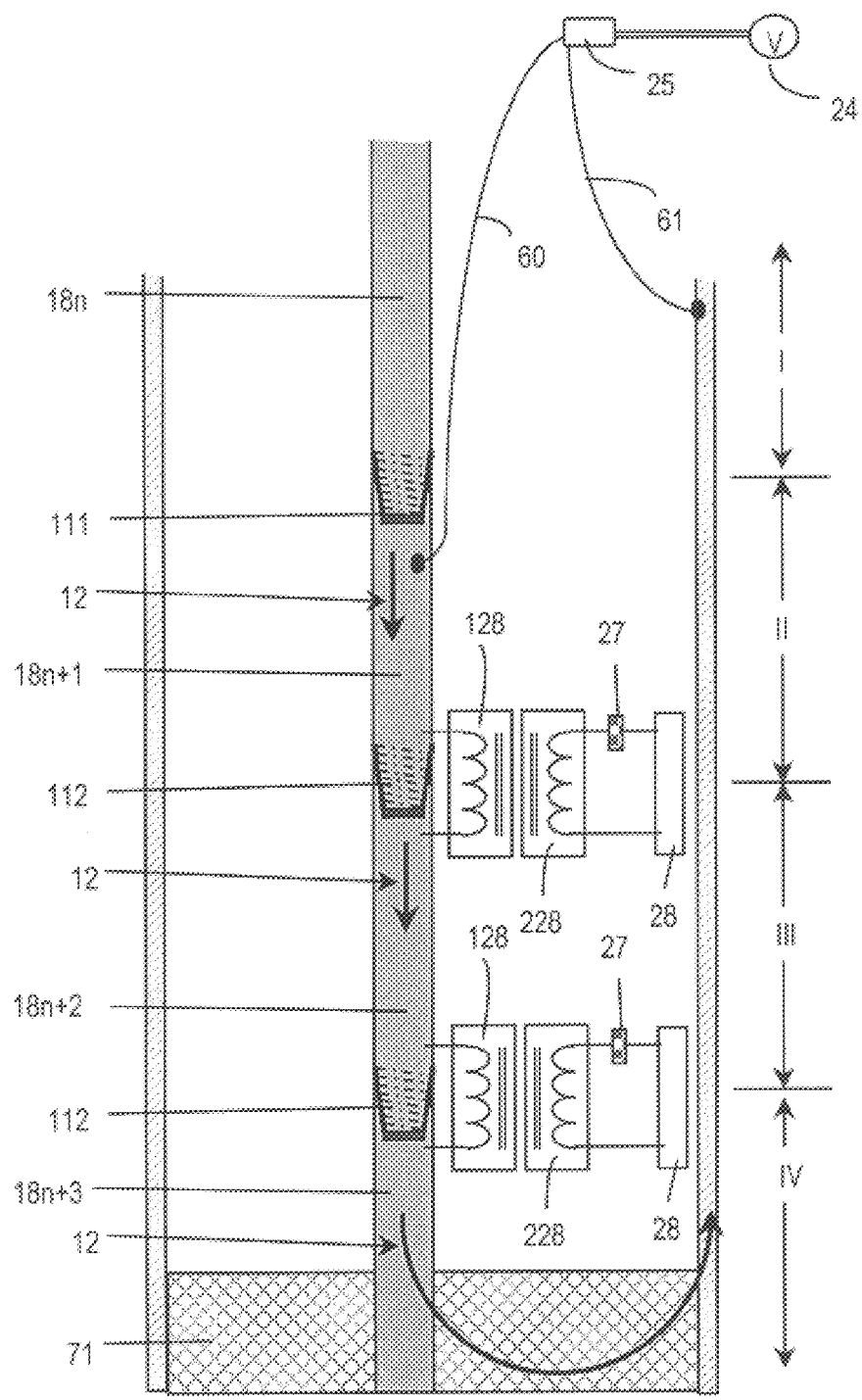
FIG. 12A illustrates one embodiment of the present invention where multiple downhole devices are connected in series downhole through use of the conduit gap in the production tubing.

FIG. 12A is an alternative embodiment of that of FIG. 10 useful for connection of multiple downhole devices.

This configuration allows for device-independent connection to maintain integrity of the series connection in case of fault at any one of the multiple devices.

Figure 12B:
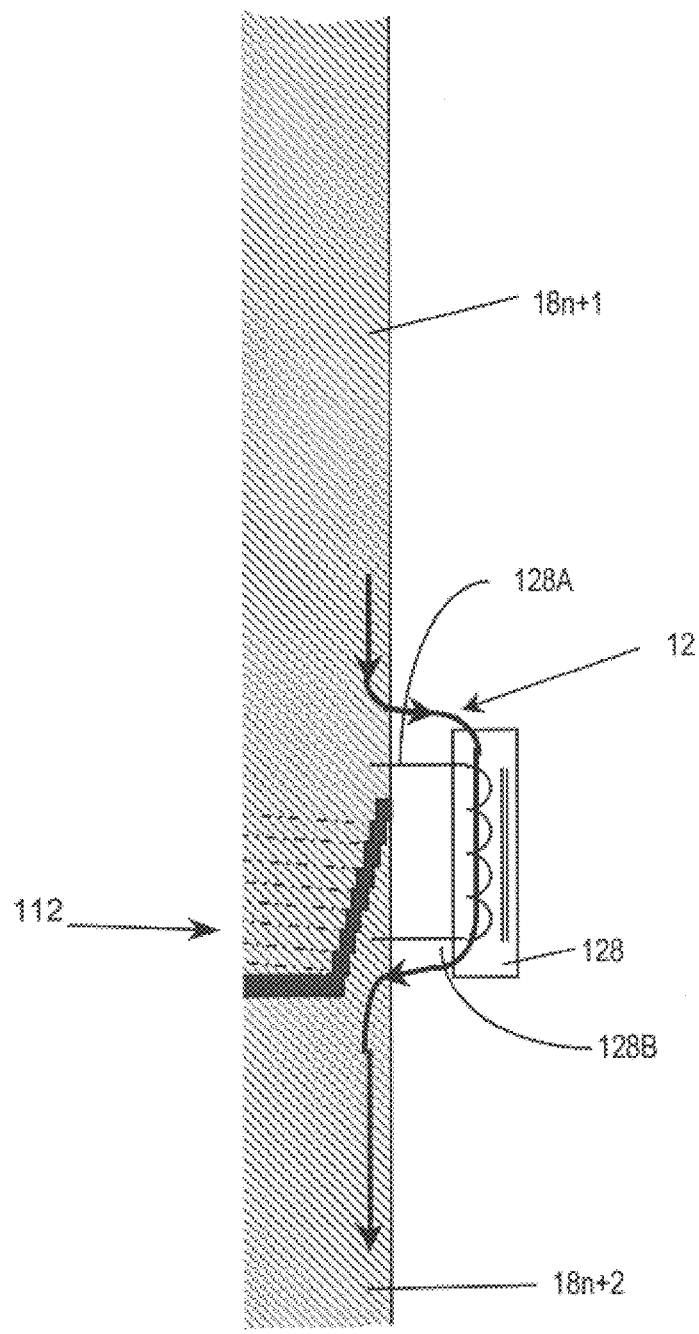
FIG. 12B illustrates the current path through the downhole device of FIG. 12A.

The embodiment of FIG. 12A avoids direct connection of the downhole device to the tubing 18 by implementation of an intermediate transformer coil 128 across the two electrical zones on either side of the conduit gaps. Here several gaps are used to implement electrical zones I, II, III and IV, as shown. The coil 128 will allow current to flow freely around gap 112 through consecutive tubing segments 18n+1 and 18n+2 or 18n+2 and 18n+3, independent of the type of device deployed. A representative current path is illustrated in FIG. 12B via leads 128A and 128B.

Zone IV tubing is electrically connected to casing 22 via appropriate means such as conductive packer 71. Where insulated tubing is used the insulative layer must be traversed or removed at conductive packer 71 to allow for electrical contact with,the casing. Conductive packer 71 will thus close the electrical circuit between tubing 18 and casing 22. Zone II and III segments should remain in electrical isolation from casing 22.

Downhole device 28 is then inductively coupled to coil 128 by a mating coil 228. Addressable circuitry can be included in encoder decoder 27 to allow for independent control of individual devices. Although only 2 such downhole devices 28 are shown, any number can be deployed in this fashion, each in conjunction with a conduit gap as shown.

Figure 13:
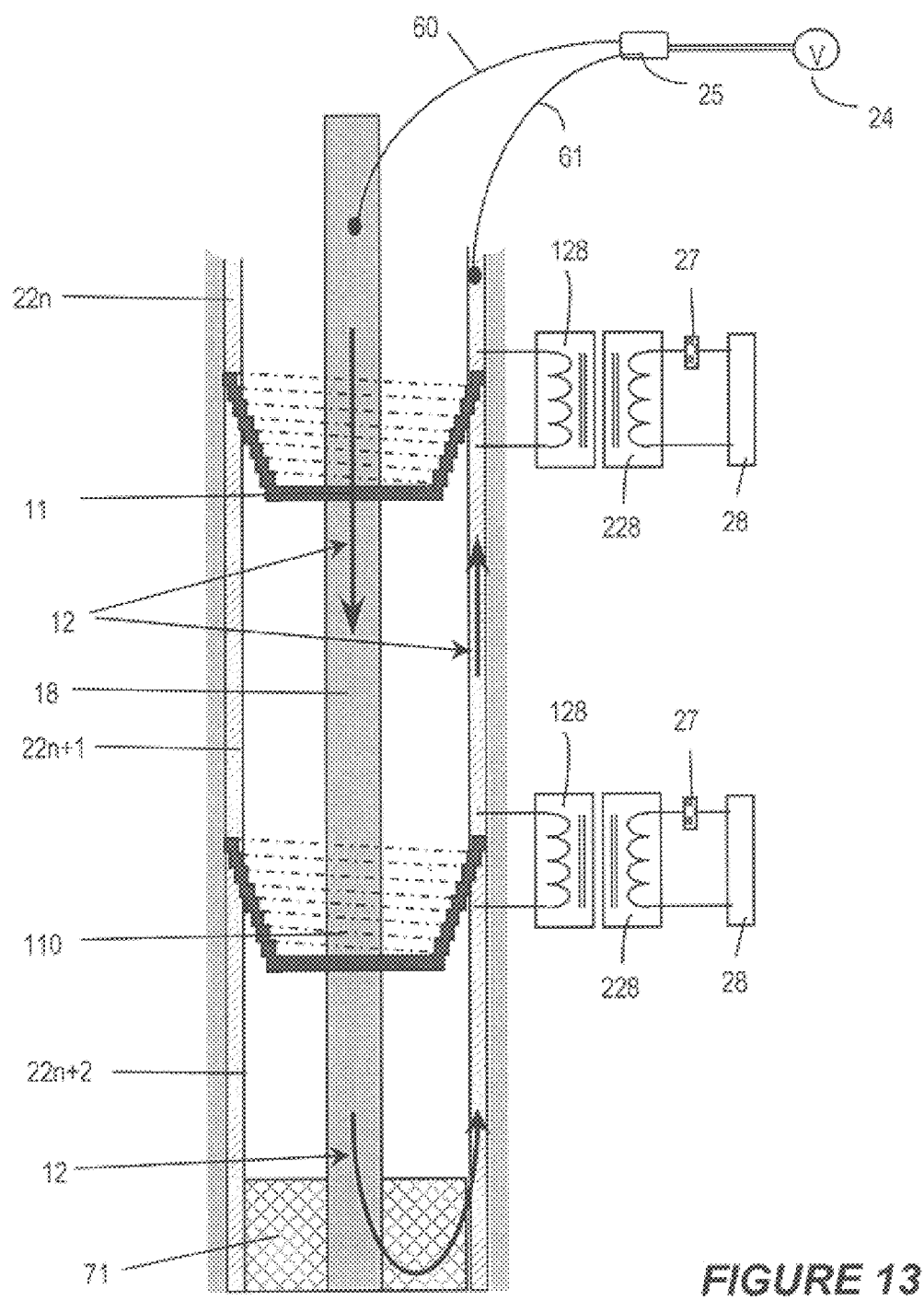
FIG. 13 illustrates one embodiment of the present invention where multiple downhole devices are connected in series downhole through use of conduit gaps in the insulated casing.

FIG. 13 is an alternative embodiment of the present invention as shown in FIG. 12A, illustrating application of the present invention across casing segments.

Principles of operation of the embodiment illustrated in FIG. 13 are similar to those described with respect to the embodiment of FIG. 12A as will be understood by one skilled in the art.

Figure 14:
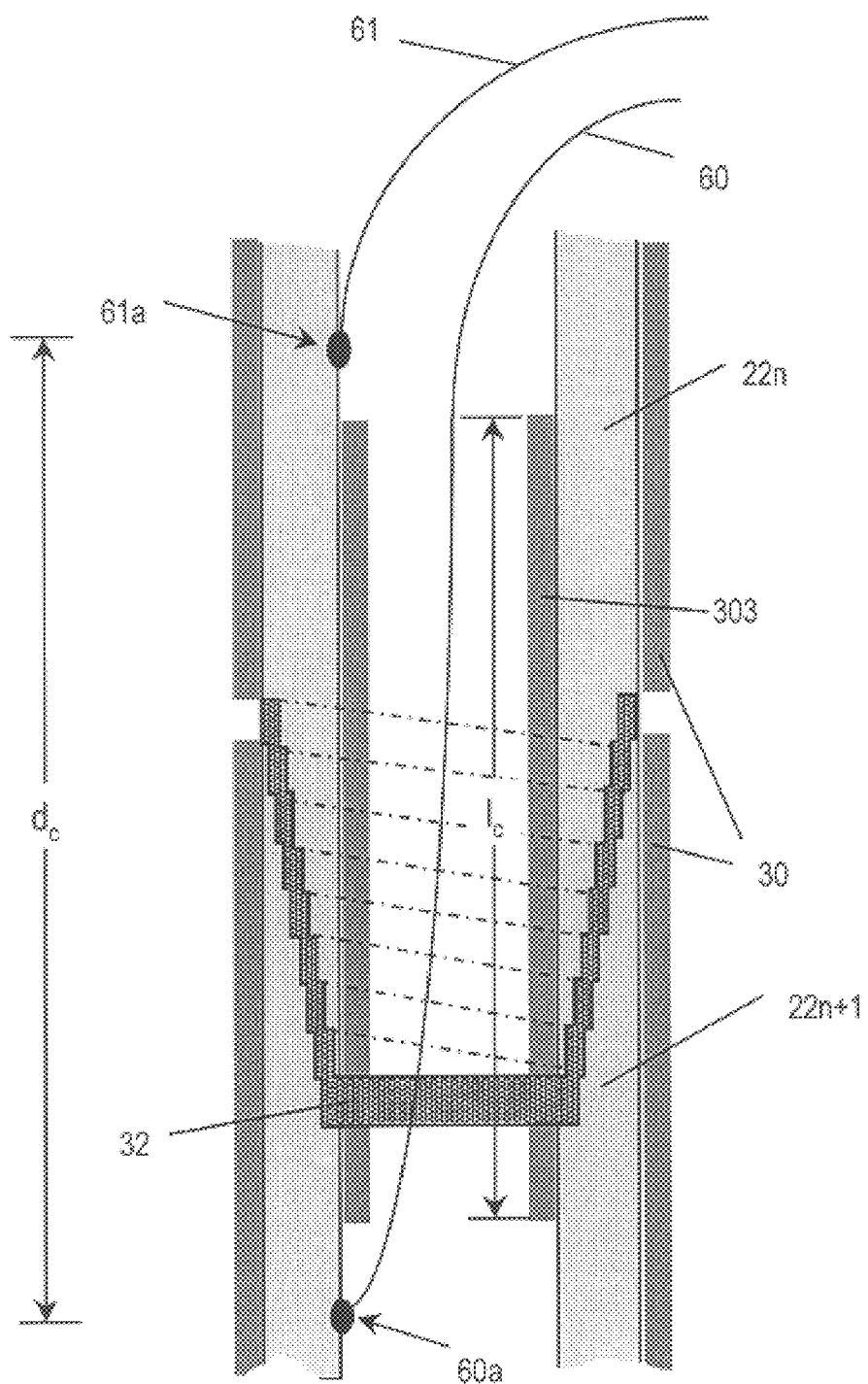
FIG. 14 depicts an illustrative embodiment of the conduit gap of present invention.

FIG. 14 depicts an illustrative embodiment of the conduit gap of the present invention.

For illustrative purposes, the various conduit gaps as discussed herein (with respect to FIGS. 4–13) are implemented as a threaded sleeve 32 of insulative material such as resin, ceramic or plastic, fitted between mating threaded conduit sections. In this illustration, the conduit is casing string with the threaded sleeve 32 fitted between adjoining threaded casing sections 22n and 22n+1. An outer insulative layer 30 is also provided in this embodiment external to the conduit to overlap the joined sections 22n and 22n+1 to prevent electrical connection between the two conduit sections via an external path, such as the surrounding cement or earth formation.

Where direct connection is utilized for current injection (such as illustrated in FIG. 14) and it is expected that conductive fluids (such as salt water) may be produced in the well, insulation on the interior of the conduit may be desirable to prevent a short circuit path between the contact points (60a and 61a in FIG. 14) through the conductive fluid. An inner insulative layer 303 around the inner circumference of the conduit (shown as casing 22 in the figure) is desirable. A minimum length $l_c$ of layer 303 can be calculated based on factors including the distance $d_c$ between contact points 60a, 61a, the expected conductivity of the fluid and the level of current to be injected (i.e., the potential expected between points 60a and 61a). A maximum length is not critical because a longer (than minimum) insulative layer 303 will result in a gain in efficiency.

The manner in which electrical isolation of the conduit sections is achieved is not essential and the implementation shown in the illustrative embodiment is not intended to be restrictive. It is important only to achieve the desired result of electrically isolating two joined (i.e., consecutive) sections of conduit on either side of the gap from each other.

Figure 15:
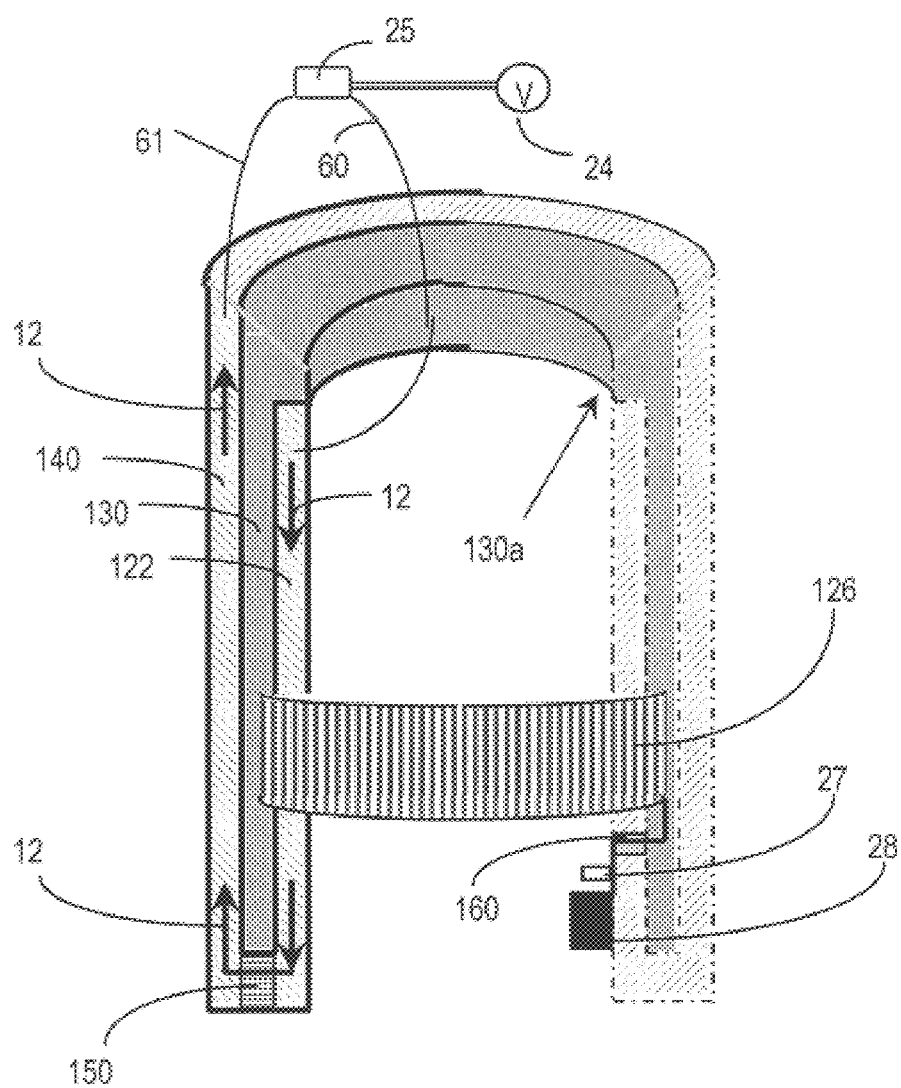
FIG. 15 illustrates an alternative embodiment of the present invention using an outer conductive layer on the insulated casing and inductive downhole coupling.

FIG. 15 shows an alternative embodiment of the present invention where the return circuit is provided by means of an additional conductive layer 140 applied to the outside of the insulating layer 130 on the conductive conduit, casing 122, forming a three-layer conductor-insulator-conductor "sandwich". The conductive layer 140 may be any conductive metal suitable for downhole use which applied to the outside of each insulated casing section before it is shipped to the wellsite; alternatively it could be in the form of a coating, paint or wrapping applied at the wellsite.

As shown in the drawing, insulative layer 130 is formed with an "overhanging" section 130a which will effect the conduit gap of the present invention.

The inner and outer conductors are electrically connected at some point during the run of the well so that current injected at the surface by source 24 via lines 60 and 61, through encoder/decoder 25, has a closed path within which to flow along illustrative current line 12. In this embodiment, the connection between inner and outer conductors is accomplished at the bottom of the well by shunt 150. A toroid 126 is disposed in the insulating layer 130, i.e., "sandwiched" between the inner conductive casing 122 and the outer conductive layer 140.

As in the earlier embodiments such as FIG. 4, measurement device 28 is installed on the casing 122 along with encoder/decoder 27. Device 28 receives electrical power from toroid 126 where the current flowing through the casing 122 inductively generates a voltage in the toroid that is used to power the sensor. The device is connected to the toroid 126 via a lead through feed through nonconductive seal 160.

The signal sensed by measurement device 28 is encoded into a second alternating current in the toroid 126, at a frequency distinct from that of the current injected at the surface, thus creating a second current in casing 122 and conductive layer 140, which is decoded by surface electronic encoder/decoder 25 and recorded or otherwise processed.

Figure 16:
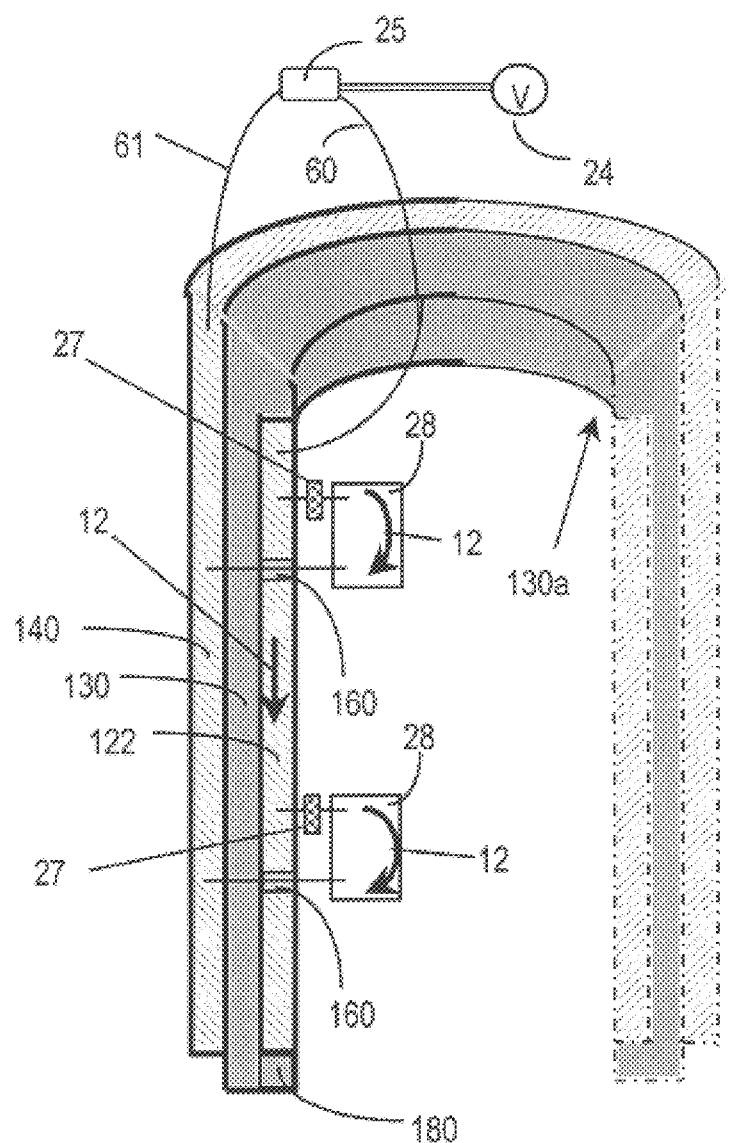
FIG. 16 illustrates an alternative embodiment of the present invention using an outer conductive layer on the insulated casing and direct (parallel) downhole coupling.

FIG. 16 illustrates another which utilizes direct downhole coupling. Like the embodiment of FIG. 15, a three-layer "sandwich", comprising conductive casing 122, insulating layer 130 and a second conductive layer 140, is used.

The two conductive elements 122 and 140 are insulated from each other by extending insulating layer 130 beyond the length of conductive casing 122 and into region 180, effecting a first conduit gap. As for the embodiment of FIG. 15, an "overhanging" section 130a effects a second conduit gap.

An electrical power source 24, typically at surface and equipped with encoder/decoder 25, establishes a voltage potential across the two conductive elements 140 and 122 via lines 60 and 61. At various points along the well, measurement devices 28 measuring properties either inside or outside the well are connected across the two conductive elements as shown where insulating feed throughs 160 insulate and seal the area of the casing 122 through which a connection between measuring device 28 and the outer conductive layer 140 is made. The measurement devices 28 can be fitted and installed on segments of three-layer casing during casing manufacture to assure a reliable connection to the two conductive elements. Current flow will be through device 28 from casing 122 to outer conductive layer 140.

Figure 17:
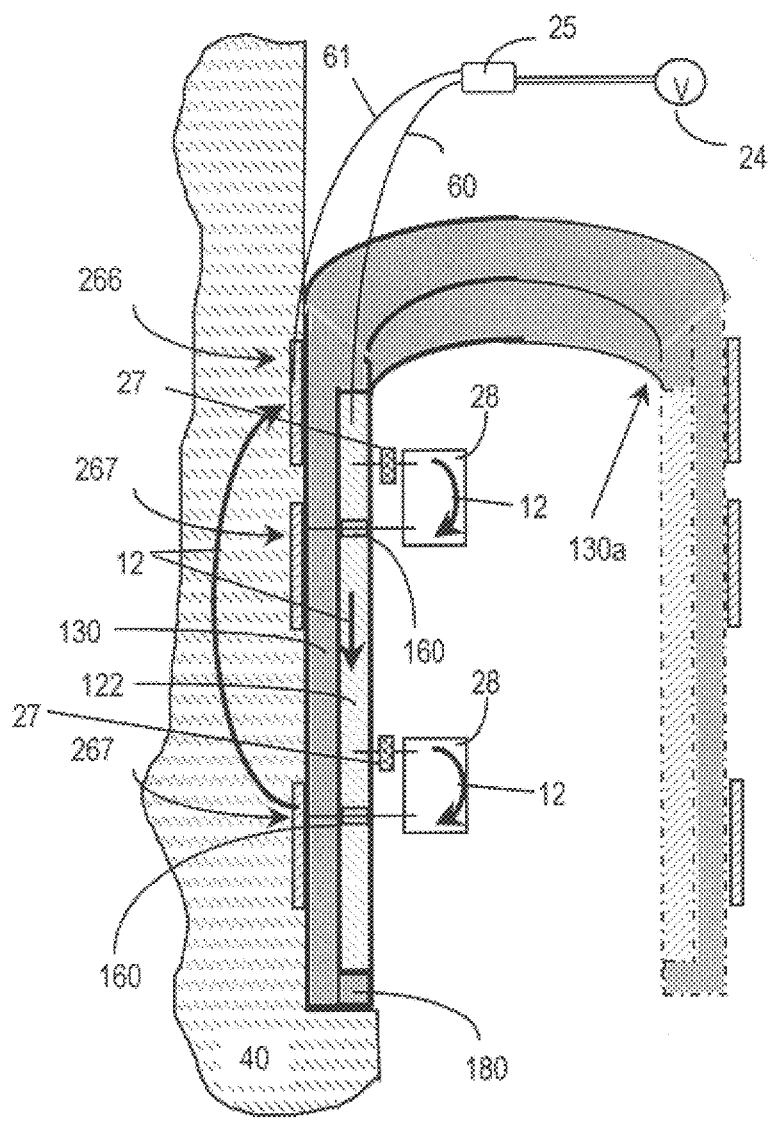
FIG. 17 illustrates an alternative embodiment of the present invention using a highly conductive cement layer as the outer conductive layer on the insulated casing and direct (parallel) downhole coupling.

The principle of operation of the alternative embodiment illustrated in FIG. 17 is similar to that of the embodiment illustrated in FIG. 16, with the conductive outer layer (140 of FIG. 16) replaced by an annulus of conductive cement 40. The conductive casing 122 is covered with an insulating layer 130 which is surrounded by conductive cement annulus 40. The two conductive elements (casing 122 and cement annulus 40) are insulated from each other, by extending insulating layer 130 beyond the length of conductive casing 122 and into region 180 forming a first conduit gap and "overhanging" section 130a effecting a second conduit gap.

At the surface, a voltage generator 24, through encoder/decoder 25, electrically connected to the casing 122 and cement annulus 40 (by electrode 266) via lines 60 and 61, applies an electric potential across the casing 122 and the conductive cement 40. At various points along the well, measurement devices 28 are placed to measure physical properties either inside or outside the casing. Such devices derive their electrical input power from the potential difference between the casing 122 and the conductive cement 40 in a manner similar to that of the FIG. 16 embodiment. In particular, the device 28 would have one power cable attached to the casing 122, and the other would pass via an insulating feed through 160 to an electrode 267 situated in the conductive cement 40. Current flow will be through device 28 from casing 122 to electrodes 267, through conductive cement 40 to electrode 266 as shown by illustrative current lines 12.

Electrodes 266 and 267 are illustrated as outer conductive layers or bands on limited segments of three-layer casing. These electrodes could also be implemented as mechanically separate electrodes disposed within the cement. However, compared to separate electrodes, implementation of the electrodes as shown in FIG. 17 as a section or band of casing would offer the advantage of increased surface area through which currents flow to power the measurement device(s).

In the illustrative embodiments described with respect to FIGS. 15–17, alternative methods of effecting the conduit gap can also be arranged as will be understood by one skilled in the art.

The present invention has been illustrated and described with respect to specific embodiments thereof. It is to be understood, however, that the above-described embodiments are merely illustrative of the principles of the invention and are not intended to be exclusive embodiments.

Alternative embodiments capturing variations in the embodiments disclosed herein can be implemented to achieve the benefits of the present invention.

It should further be understood that the foregoing and many various modifications, omissions and additions may be devised by one skilled in the art without departing from the spirit and scope of the invention.

We claim:

1. A method for transmitting at least one electrical signal to or from at least one downhole device in a well, the method comprising the steps of:
   a) providing an electrically conductive conduit in the well;
   b) electrically insulating a section of the conduit by encapsulating a section of the conduit with an insulative layer and insulating the encapsulated section of conduit from an adjoining section of the conduit by a conduit gap;
   c) introducing the electrical signal within the insulated section of conduit;
   d) providing a return path for the electrical signal; and
   e) coupling the downhole device to the insulated section.

2. The method of claim 1 further including the step of coupling a surface device to the insulated section of conduit.

3. The method of claim 2 wherein the step of coupling a surface device is performed via direct coupling.

4. The method of claim 2 wherein the step of coupling a surface device is performed via inductive coupling.

5. The method of claim 1 wherein the step of providing an electrically conductive conduit further comprises the step of providing electrically conductive casing permanently installed in the well via cementation.

6. The method of claim 5 wherein the return path for the electrical signal is provided through the cement.

7. The method of claim 1 further comprising the step of providing an outer electrically conductive layer on the insulated conduit.

8. The method of claim 7 wherein the return path is provided through the outer conductive layer.

9. The method of claim 1 further comprising the step of disposing the conduit gap within the insulative layer.

10. An apparatus for transmitting at least one electrical signal to or from at least one downhole device in a well, the apparatus comprising:
    a) an electrically conductive conduit installed in the well;
    b) insulation means for electrically insulating a section of the conduit, the insulation means comprising an insulative encapsulation layer around the section of the conduit and a conduit gap insulating the insulated section of the conduit from an adjoining section of the conduit;
    c) means for introducing the electrical signal within the insulated section of the conduit;
    d) means for providing a return path for the electrical signal; and
    e) means for electrically connecting the downhole device to the insulated section of the conduit.

11. The apparatus of claim 10 further comprising means for coupling a surface device to the insulated section of conduit.

12. The apparatus of claim 11 wherein the means for coupling the surface device employs direct coupling.

13. The apparatus of claim 11 wherein the means for coupling the surface device employs inductive coupling.

14. The apparatus of claim 10 wherein the electrically conductive conduit further comprises an electrically conductive casing permanently installed in the well via cementation.

15. The apparatus of claim 14 wherein the return path for the electrical signal is provided through the cement.

16. The apparatus of claim 10 further comprising an outer electrically conductive layer on the insulated conduit.

17. The apparatus of claim 16 wherein the return path is provided through the outer conductive layer.

18. The apparatus of claim 10 wherein the conduit gap is disposed within the insulative layer.

19. An apparatus for transmitting at least one electrical signal within a well, the apparatus comprising:
   a first electrically conductive conduit disposed in said well;
   a secondary electrically conductive conduit disposed in said well, said second conduit having first and second sections insulated therebetween, said first electrically conductive conduit electrically coupled to said second section of said second conduit;
   insulation to electrically insulate said first conduit from said second conduit;
   an incoming path, coupled to said first conduit, to introduce the at least one electrical signal within said first conduit; and
   a return path, coupled to said first section, to provide a return path to the at least one electrical signal.

20. The apparatus of claim 19 wherein said insulation includes an insulative layer encapsulating said first and second sections of said second conduit.

21. The apparatus of claim 20 wherein said insulation further includes a first gap disposed within the insulative layer and electrically insulating said first section from said second section.

22. The apparatus of claim 21 wherein said first gap includes a threaded sleeve of insulative material.

23. The apparatus of claim 22 wherein said first and second sections include threaded adjoining ends, the threaded sleeve fitted between the thread adjoining ends.

24. The apparatus of claim 22 wherein said insulative material includes one of resin and ceramic and plastic.

25. The apparatus of claim 19 wherein said insulation includes outer and inner insulative layers disposed over outer and inner surfaces of said conduit respectively.

26. The apparatus of claim 21 wherein said gap is integral with said insulative layer.

27. The apparatus of claim 26 wherein said gap includes an overhanging of said insulative layer.

28. The apparatus of claim 19 wherein said first conduit includes a production tubing.

29. The apparatus of claim 28 wherein said second conduit includes a casing.

30. The apparatus of claim 19 further including an electrically conductive packer to couple said first conduit to said second section of said second conduit.

31. The apparatus of claim 19 wherein said incoming path and return path are coupled to a surface device.

32. The apparatus of claim 31 wherein the surface device is coupled to said first and second conduits by way of direct coupling.

33. The apparatus of claim 31 wherein the surface device is coupled to said first and second conduits by way of inductive coupling.

34. The apparatus of claim 29 wherein said casing is permanently installed in the well via cementation.

35. The apparatus of claim 34 wherein the return path for the electrical signal is provided through cement.

36. The apparatus of claim 19 further including a first downhole device coupled to said second section.

37. The apparatus of claim 36 wherein said first downhole device is inductively coupled to said second section.

38. The apparatus of claim 21 further including a second gap insulating a first subsection of the second section from a second subsection of the second section.

39. The apparatus of claim 38 wherein said first downhole device is directly coupled between said first subsection and said second subsection.

40. The apparatus of claim 36 wherein said at least one electrical signal includes a first signal to provide power to the apparatus and a second signal to communicate between said surface device and said first downhole device.

41. An apparatus for transmitting at least one electrical signal within a well, the apparatus comprising:
   a main electrically conductive conduit having first and second sections;
   insulation to electrically insulate said first and second sections;
   a plurality of secondary electrically conductive conduits, each disposed in a plurality of wells,
   said plurality of secondary conduits coupled to said second section of said main electricity conductive conduit;
   an incoming path, coupled to said second section, to introduce the at least one electrical signal within the main conduit;
   a plurality of return paths each coupled to said first section to provide a return path to the at least one electrical signal for each of the plurality of secondary conduits; and
   insulation to electrically insulate each of said plurality of secondary electrically conductive conduits from a corresponding return path.

42. The apparatus of claim 41 wherein the insulation to electrically insulate said first and second sections includes an insulative layer encapsulating said first and second sections of said second conduit.

43. The apparatus of claim 42 wherein said insulation to electrically insulate said first and second sections further includes a first gap disposed within the insulative layer and electrically insulating said first section from said second section.

44. The apparatus of claim 43 wherein said first gap includes a threaded sleeve of insulative material.

45. The apparatus of claim 44 wherein said first and second sections include threaded adjoining ends, the threaded sleeve fitted between the threaded adjoining ends.

46. The apparatus of claim 44 wherein said insulative material includes one of resin and ceramic and plastic.

47. The apparatus of claim 41 wherein said insulation to electrically insulate said first and second sections includes outer and inner insulative layers disposed over outer and inner surfaces of said conduit respectively.

48. The apparatus of claim 45 wherein said gap is integral with said insulative layer.

49. The apparatus of claim 48 wherein said gap includes an overhanging of said insulative layer.

50. The apparatus of claim 41 further comprising means for coupling a surface device to the main conduit.

51. The apparatus of claim 50 wherein the means for coupling the surface device employs direct coupling.

52. The apparatus of claim 51 wherein the means for coupling the surface device employs inductive coupling.

53. The apparatus of claim 41 wherein that main electrically conductive conduit comprises an electrically conductive casing permanently installed in the well via cementation.

54. The apparatus of claim 53 wherein the return path for the electrical signal is provided through cement.

55. The apparatus of claim 41 further comprising an outer electrically conductive layer on the insulated conduit.

56. The apparatus of claim 55 wherein the return path is provided through the outer conductive layer.

57. The apparatus of claim 41 wherein each of the plurality of secondary conduits comprises an electrically conductive casing permanently installed in the respective well via cementation.

58. The apparatus of claim 41 wherein for each of the plurality of secondary conduits an insulative layer encapsulates the respective secondary conduit.

59. The apparatus of claim 57 wherein the return path for the electrical signal is provided through cementation for each of the plurality of secondary conduits.

60. The apparatus of claim 41 further comprising an outer electrically conductive layer on the insulated conduit for each of the plurality of secondary conduits.

61. The apparatus of claim 60 wherein the return path is provided through the outer conductive layer for each of the plurality of secondary conduits.

62. The apparatus of claim 41 further including, for each of said plurality of secondary conduits, a downhole device coupled to the respective secondary conduit.

63. The apparatus of claim 62 wherein each of said downhole devices is inductively coupled to said respective secondary conduit.

64. The apparatus of claim 43 further including for each of said secondary conduits a second gap insulating a first section of the respective secondary conduit from a second section of the respective secondary conduit, said insulative layer extending over said second gap.

65. The apparatus of claim 62 wherein said downhole device is coupled between said first section and said second section of the respective secondary conduit.

66. The apparatus of claim 62 wherein for each of said secondary conduits said downhole device is directly coupled to said respective secondary conduit.

67. The apparatus of claim 41 wherein said at least one electrical signal includes a first signal to provide power to the apparatus and a second signal to provide communication between a surface device and a downhole device.

68. The apparatus of claim 67 wherein said surface device is adapted with addressable encoder/decoder circuitry to communicate with the downhole device.

69. The apparatus of claim 62 wherein each downhole device of the plurality of secondary conduits includes addressable encoder/decoder circuitry to communicate with a surface device.

70. The apparatus from transmitting at least one electrical signal within a well, the apparatus comprising:

a first electrically conductive conduit having first and second sections;

a second electrically conductive conduit surrounding said first conduit and coupled to said second section;

insulation to insulate said first section from said second electrically conductive conduit;

an ingoing signal path, coupled to said first section, to introduce at least one electrical signal within said first electrically conductive conduit; and a return signal path coupled to said second conduit to provide a return path to said at least one electrical signal.

71. The apparatus of claim 70 wherein said insulation includes a non-conductive fluid.

72. The apparatus of claim 71 wherein said insulation includes a first gap to electrically insulate said first section from said second section.

73. The apparatus of claim 72 wherein said first gap includes a threaded sleeve of insulative material.

74. The apparatus of claim 73 wherein said first and second sections include threaded adjoining ends, the threaded sleeve fitted between the threaded adjoining ends.

75. The apparatus of claim 73 wherein said insulative material includes one of resin and ceramic and plastic.

76. The system of claim 70 wherein said first electrically conductive conduit includes a production tubing.

77. The apparatus of claim 76 wherein said second electrically conductive conduit includes a casing.

78. The apparatus of claim 70 further including a surface device coupled to said first electrically conductive conduit.

79. The apparatus of claim 78 wherein said surface device is coupled to said first electrically conductive conduit by way of direct coupling.

80. The system of claim 78 wherein said surface device is coupled to said first electrically conductive conduit by way of inductive coupling.

81. The apparatus of claim 70 further including a packer to couple said second section of said first conduit to said second conduit.

82. The apparatus of claim 80 further including a first downhole device couple to said first and second sections.

83. The apparatus of claim 82 wherein said first downhole device is directly coupled between said first and second sections.

84. The apparatus of claim 82 wherein said first downhole device is inductively coupled between said first and second sections.

85. The apparatus of claim 72 further including a second gap insulating a first subsection from a second subsection of the second section of the first conduit.

86. The apparatus of claim 85 further including a second downhole device directly coupled to said first and second subsections.

87. The apparatus of claim 85 further including a second downhole device inductively coupled to said first and second subsections.

88. The apparatus of claim 82 wherein said at least one electrical signal includes a first signal to provide power to the apparatus and a second signal to communicate between a surface device and said first downhole device.

* * * * *